United States Patent
Shimizu et al.

(10) Patent No.: US 8,096,192 B2
(45) Date of Patent: Jan. 17, 2012

(54) FLOWMETER

(75) Inventors: Atsushi Shimizu, Osaka (JP); Kazuhiro Makino, Osaka (JP)

(73) Assignee: Keyence Corporation, Osaka (JP)

( * ) Notice: Subject to any disclaimer, the term of this patent is extended or adjusted under 35 U.S.C. 154(b) by 366 days.

(21) Appl. No.: 12/486,065

(22) Filed: Jun. 17, 2009

(65) Prior Publication Data

US 2010/0005906 A1    Jan. 14, 2010

(30) Foreign Application Priority Data

Jul. 9, 2008  (JP) .................................. 2008-178635
Jul. 24, 2008 (JP) .................................. 2008-190745

(51) Int. Cl.
*G01F 1/84* (2006.01)
(52) U.S. Cl. ................................. 73/861.357
(58) Field of Classification Search ............ 73/861.355–861.357
See application file for complete search history.

(56) References Cited

U.S. PATENT DOCUMENTS

| | | | |
|---|---|---|---|
| 4,756,198 A | | 7/1988 | Levien |
| 5,357,811 A | * | 10/1994 | Hoang ..................... 73/861.355 |
| 6,895,826 B1 | * | 5/2005 | Nakao et al. ............. 73/861.355 |
| 7,353,718 B2 | * | 4/2008 | Mehendale et al. ..... 73/861.355 |

FOREIGN PATENT DOCUMENTS

| | | |
|---|---|---|
| JP | 11-337383 | 12/1999 |
| JP | 2003-207380 | 7/2003 |

* cited by examiner

*Primary Examiner* — Jewel V Thompson
(74) *Attorney, Agent, or Firm* — Kilyk & Bowersox, P.L.L.C.

(57) ABSTRACT

A flowmeter of Coriolis type includes a supporting base that supports a pair of fluid pipes in a manner capable of being vibrated, and a frame fixed to the supporting base. The frame is integrally formed with a mounting portion disposed between the fluid pipes and having a thickness that does not interfere with the fluid pipes, a reinforcing portion disposed at the outer circumference of the mounting portion and enhancing the rigidity of the mounting portion, and a fixing portion for being fixed to the supporting base. The reinforcing portion has an outer wall portion that protrudes at least to one side of the thickness direction of the mounting portion, and substantially continuously surrounds the outer circumference of the fluid pipes. Penetrating portions for disposing the coils corresponding to respective magnetic substances mounted on the fluid pipe are formed in the mounting portion.

17 Claims, 24 Drawing Sheets

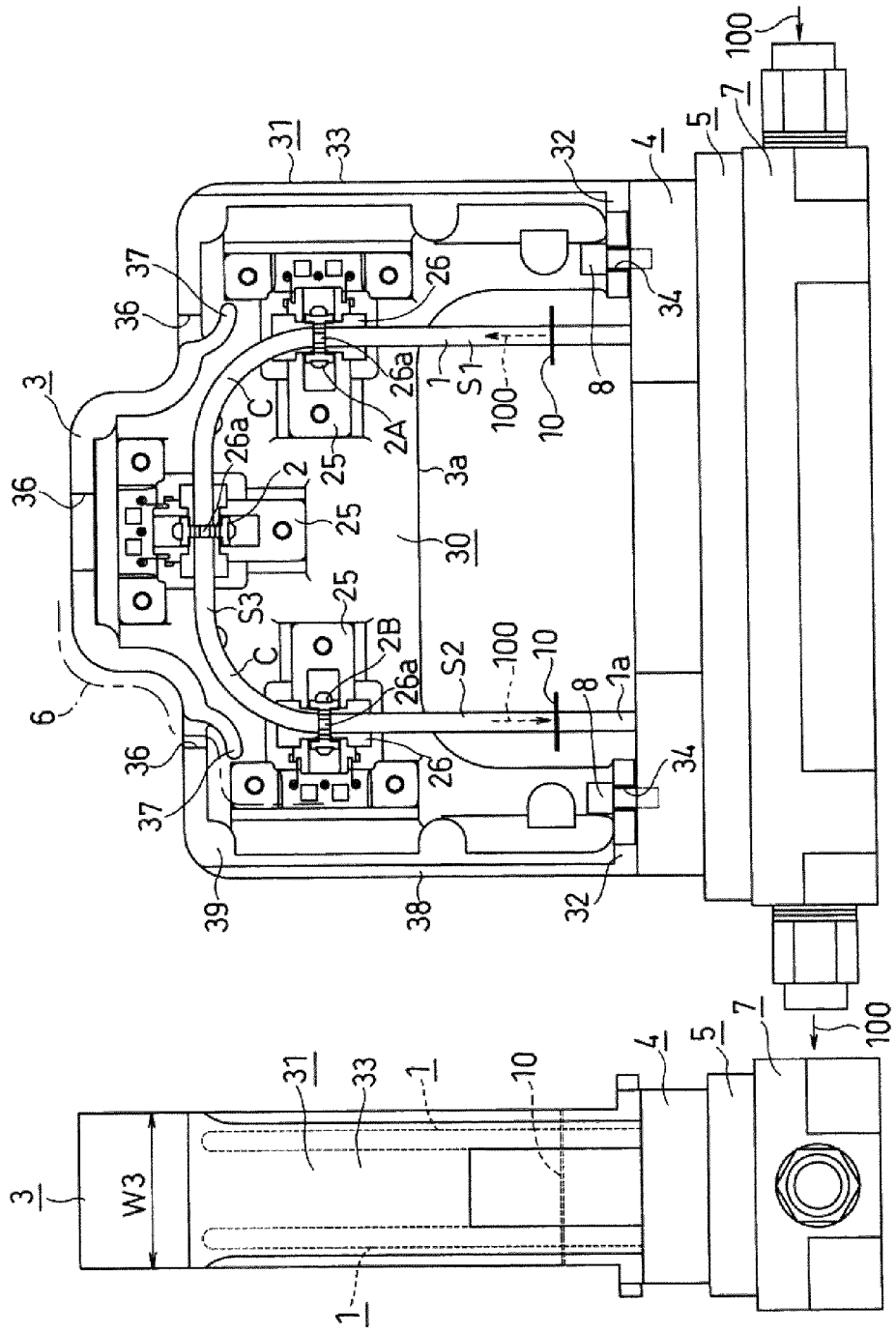

NEUTRAL STATE

EQUAL-PHASE
VIBRATION

VIBRATION BY
EXTERNAL
TURBULENCE

REVERSE-PHASE
VIBRATION

VIBRATION BY
OSCILLATOR

NEUTRAL STATE

EQUAL-PHASE
VIBRATION

VIBRATION BY
EXTERNAL
TURBULENCE

REVERSE-PHASE
VIBRATION

VIBRATION BY
OSCILLATOR

F I G. 17A    SATIN WEAVE
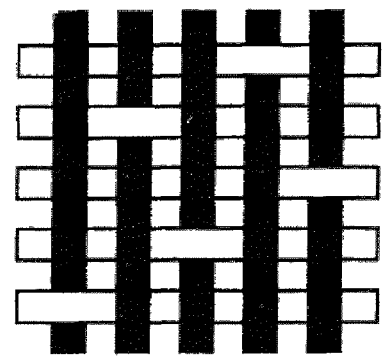
F I G. 17B    TWILL WEAVE
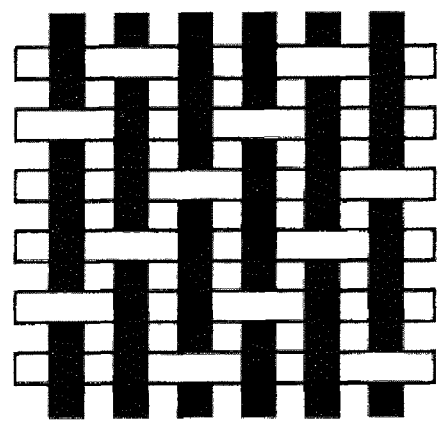
F I G. 17C    PLAIN WEAVE
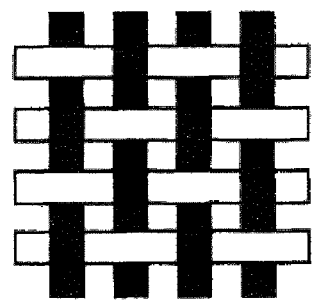

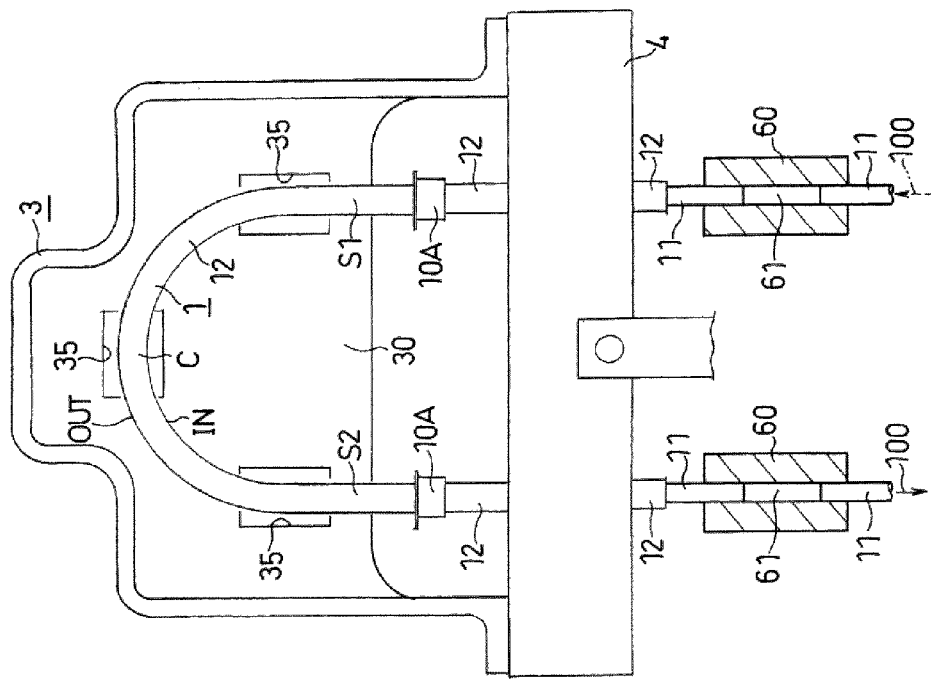
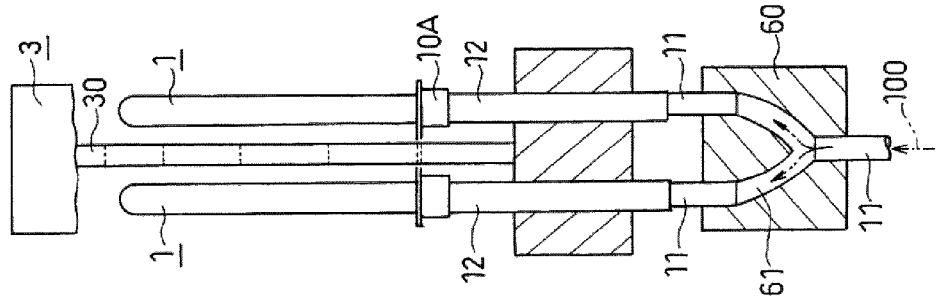

F I G. 2 4
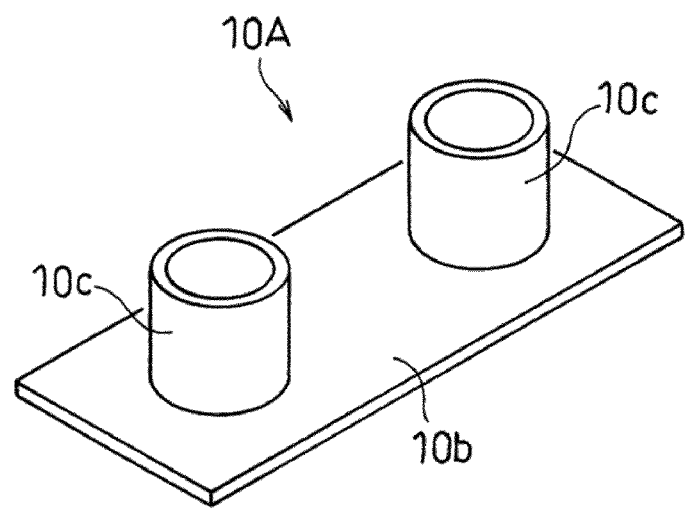

FLOWMETER

CROSS-REFERENCE TO RELATED APPLICATIONS

The present application claims foreign priority based on Japanese Patent Applications No. 2008-178635, filed Jul. 9, 2008, and No. 2008-190745, filed Jul. 24, 2008, the contents of which is incorporated herein by reference.

BACKGROUND OF THE INVENTION

1. Field of the Invention

The present invention relates to a mass flowmeter of Coriolis type that generates a force known as Coriolis force acting in proportion to the mass flow rate of a fluid passing through a pipe by forcibly oscillating the pipe, and determining the mass flow rate by detecting a phase difference of the vibrations on the upstream side and on the downstream side of the pipe.

2. Description of the Background Art

A flow meter of Coriolis type forcibly oscillates with an oscillator a fluid pipe for passing a fluid to be measured, detects a phase difference of the vibrations generated on the upstream side and on the downstream side of a flow path in accordance with a flow rate of the mass of a fluid, and determines the mass flow rate from the phase difference.

Here, prior to the description of the problem of the present invention, a structure, a principle, and the like of a mass flowmeter of Coriolis type will be described.

In FIG. 11, for example, a substantially U-shaped fluid pipe 1 forms a flow path of a measurement fluid 100 to be measured. The measurement fluid 100 is introduced from one end of the fluid pipe 1, and passes through a bent portion and a straight-pipe portion to be ejected from the other end.

Both ends of the substantially U-shaped fluid pipe 1 are fixed to a supporting portion 101. When this is seen from a viewpoint of structural mechanics, the supporting portion 101 serving as a supporting member supports the fluid pipe 1 such that both ends of the fluid pipe 1 will be fixed ends relative to the vibration generated by the oscillation of a oscillator 2 described below, that is, it will be similar to a structure where the fluid pipe 1 is supported in a cantilever state. As a result, as shown in the model view of FIG. 13A, the fluid pipe 1 can be warped with an axis located at both ends inserted into the supporting portion 101, that is, at the fixed ends of the vibration by the oscillation or in its vicinity.

In FIG. 11, an oscillator 2 is disposed at an intermediate portion in the fluid pipe 1. The oscillator 2 is made of a permanent magnet 21 fixed to the fluid pipe 1 and an electromagnetic driving coil 22 fixed on a base 102. The permanent magnet 21 (magnetic substance) is inserted into the electromagnetic driving coil 22, and oscillates the fluid pipe 1 when an alternating current is passed through the electromagnetic driving coil 22 by an oscillation circuit 34 (FIG. 12).

On the other hand, the fluid pipe 1 is provided respectively with first and second detectors 2A, 2B. That is, the first and second detectors 2A, 2B are arranged to be spaced apart from each other on the upstream side and on the downstream side along a flow path of the fluid pipe 1. Each of the detectors 2A, 2B of FIG. 11 is made of a well-known electromagnetic pickup, and detects the velocity of the vibration which is one of the vibration states in the vertical direction of the fluid pipe 1 when a detected element 23 made of a permanent magnet (magnetic substance) performs a reciprocating movement within a coil 24.

In FIG. 12, a signal related to the velocity of the vibration that has been detected by the first detector 2A passes through one detection circuit 33 to be transmitted to a calculator 32 of a microcomputer 3 and to be transmitted to an oscillation circuit 34. The oscillation circuit 34 supplies to the electromagnetic driving coil 22 constituting the oscillator 2 an electric current that accords to the magnitude and the positive/negative direction of the signal related to the velocity of the vibration that has been detected by the first detector 2A such that positive feedback may be applied. At this time, positive feedback is applied at a specific natural frequency of the fluid pipe 1 which is a frequency at which the vibration is difficult to be damped against the oscillation to generate an oscillated state, whereby the vibration at the basic natural frequency can be maintained at a constant level. Here, by adjusting the arrangement of the first detector 2A, the positive/negative direction of the positive feedback, and the like, the vibration of the fluid pipe 1 can be maintained at a specific frequency of higher order selectively from a plurality of the natural frequencies of the fluid pipe 1.

When a setting is made to oscillate at the basic natural frequency, the fluid pipe 1 vibrates while warping up and down in the order of the one-dot chain line L1, the solid line L0, and the two-dot chain line L2 of FIG. 13A by the oscillation.

On the other hand, by the oscillation and the flow of the measurement fluid 100 (FIG. 11), a force known as Coriolis force acts on the fluid pipe 1, whereby the fluid pipe 1 warps and vibrates up and down while being twisted as shown in FIG. 13B.

The magnitude of the Coriolis force is proportional to the mass of the fluid that flows through the fluid pipe 1, the velocity thereof, and the angular velocity of the oscillation, and the direction of the force coincides with the direction of the vector product of the movement direction (velocity vector) of the fluid and the angular velocity at which the fluid pipe 1 is oscillated. The flow direction of the fluid will be opposite on the entrance side and on the exit side of the fluid in the fluid pipe 1. For this reason, a torque of twist is generated in the fluid pipe 1 by the Coriolis force. This torque changes with the same frequency as the oscillation frequency, and the amplitude value thereof will have a predetermined relationship with the mass flow rate of the fluid.

The warpage of the fluid pipe 1 of FIG. 13A by the oscillation and the twist of the fluid pipe 1 of FIG. 13B by the Coriolis force are superposed on each other. The calculator 32 of the microcomputer 3 of FIG. 12 calculates the mass of the measurement fluid 100 that passes through the flow path of the fluid pipe 1 based on the phase of the amplitude of the twist, that is, the phase difference of the velocity signals of vibration at respective positions constituting information of each vibration detected by the detectors 2A, 2B and the detection circuits 33, 33.

Incidentally, a flowmeter is conventionally known in which a pair of fluid pipes 1 is provided, and the pair of fluid pipes is arranged in mirror symmetry so as to face each other (See U.S. Pat. No. 4,756,198, front page, Japanese Patent Application Laid-open No. 11-337383, FIG. 7, and Japanese Patent Application Laid-open No. 2003-207380, FIG. 1).

The flowmeter such as disclosed in U.S. Pat. No. 4,756, 198, in which a coil is provided between a pair of fluid pipes and a magnetic substance core is provided in each of the fluid pipes and arranged in ideal mirror symmetry, can be expected that the vibration of the pair of fluid pipes will be an ideal sound or vibration by oscillation to achieve mirror symmetry, to a greater extent than a flowmeter in which a coil is provided in one of the fluid pipes and a magnetic substance core is provided in the other.

However, since the coil is disposed at a position at which the pair of fluid pipes can easily vibrate, the coil is disposed at a position that is spaced apart to some extent from a base to which the pair of fluid pipes is fixed. As a result, the coil will be supported in a cantilever state. The coil supported in a cantilever state will be not only likely to be vibrated by external turbulence vibration, but also receive a counter force of the fluid pipe due to the production errors and the like, whereby the vibration generated in the coil will be a cause of decrease in the precision. In order to alleviate the vibration generated in the coil, it is considered that the scale for achieving higher rigidity of the cantilever supporting portion is increased; however, increase in the scale and increase in the mass of the flowmeter are inevitable, thereby deteriorating the advantages of providing a pair of fluid pipes.

Therefore, a main object of the present invention is to prevent decrease in the measurement precision and to achieve scale reduction of a flow meter in the flowmeter of Coriolis type having a constitution of ideal mirror symmetry.

Incidentally, when a pair of fluid pipes is brought close to each other, the two fluid pipes undergo resonance, and the vibration states thereof will be likely to be equal to each other, so that the measurement precision will be improved. However, when the pair of fluid pipes is brought close to each other, the assembly work of fixing the magnetic substance to the fluid pipes will be difficult.

Therefore, another object of the present invention is to facilitate or enable the assembly work of a flowmeter having a reduced scale.

SUMMARY OF THE INVENTION

In order to achieve the object, the present invention relates to a flow meter having a pair of fluid pipes forming a flow path for allowing a measurement fluid to flow therethrough, having a substantially equal shape and equal size with each other, and arranged to be substantially mirror-symmetric and parallel; an oscillator including a coil and a magnetic substance for oscillating the fluid pipes; a plurality of detectors disposed to be spaced apart from each other along the flow path of the fluid pipes and including a coil and a magnetic substance for detecting a state of vibration of the fluid pipes; and a calculator that calculates a mass flow rate of the measurement fluid that passes through the flow path of the fluid pipes based on each vibration that is detected by the plurality of detectors, the flowmeter further includes a supporting base to which an end portion of each of the fluid pipes is mounted and which supports each of the fluid pipes in a manner capable of being vibrated; and a frame fixed to the supporting base, wherein the frame is integrally formed with a mounting portion disposed between the pair of fluid pipes and having a thickness that does not interfere with the pair of fluid pipes, a reinforcing portion disposed at an outer circumference of the mounting portion and enhancing a rigidity of the mounting portion, and a fixing portion for being fixed to the supporting base, the reinforcing portion has an outer wall portion that protrudes at least to one side of a thickness direction of the mounting portion, and generally continuously surrounds an outer circumference of the fluid pipes, and penetrating portions for disposing the coils corresponding to the respective magnetic substances mounted on the fluid pipe are formed in the mounting portion.

According to the present invention, in a flowmeter in which the coils of an oscillator and detectors are arranged between a pair of fluid pipes, a penetrating portion for arranging the coils in a penetrating state is formed in the mounting portion, so that the mounting portion can be made to have a reduced thickness while bringing the pair of fluid pipes close to each other. For this reason, the distance between the pair of fluid pipes will be smaller, thereby achieving the scale reduction of the flowmeter.

Since a reinforcing portion for enhancing the rigidity of the mounting portion thus made to have a smaller thickness is provided so as to surround the outer circumference of the fluid pipes, the rigidity of the thin mounting portion will be enhanced, whereby the vibration can be restrained, and also the natural frequency of the mounting portion will be away from that of the fluid pipes, so that the vibration separation will be easier thereby to restrain the decrease in the measurement precision.

BRIEF DESCRIPTION OF THE DRAWINGS

FIG. 2A is a schematic side view illustrating a state in which the flowmeter is mounted on a pipe section, and FIG. 2B is a schematic front view of the same;

FIG. 15A is a plan view, FIG. 15B is an outer side view, and FIG. 15C is an inner side view;

FIG. 17A to 17C are plan views illustrating examples of a weave structure;

FIGS. 23A and 23B are a partially fractured schematic side view and a schematic front view illustrating a mounted state of another fluid pipe;

FIG. 24 is a schematic perspective view illustrating a connection member as viewed from below.

DESCRIPTION OF THE PREFERRED EMBODIMENTS

Figure 1:
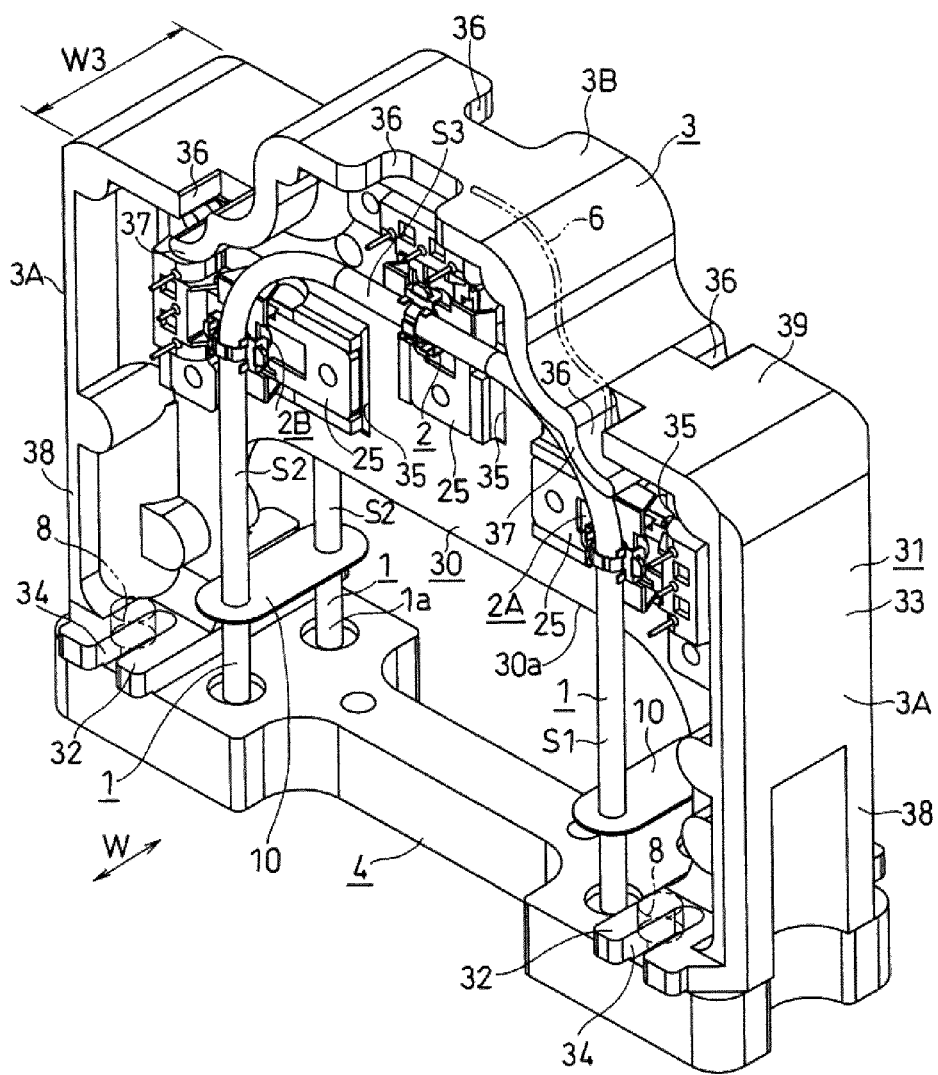
FIG. 1 is a schematic perspective view illustrating a flowmeter according to Example 1 of the present invention.

In the present invention, besides a constitution in which the penetrating portion is a through-hole where all outer circumferences is surrounded by the solid part (metal) of the frame, a constitution may be adopted in which the penetrating portion is a cut-out portion where three sides of the outer circumference are surrounded by the solid part of the frame.

In the case of the through-hole, since the mounting portions around the through-hole are connected, the rigidity of the mounting portion will be large, so that the vibration will be less likely to occur.

On the other hand, in the case of the cut-out portion, in order to prevent decrease in the rigidity of the mounting portion, a reinforcing section for reinforcing the cut-out portion is preferably provided.

In a preferred example of the present invention, the mounting portion has a plate-shaped plate portion having a thickness smaller than a distance between the pair of fluid pipes, and a width of the outer wall portion relative to the thickness direction is larger than the distance between the pair of fluid pipes.

In this case, the rigidity of the plate-shaped portion will increase because of the outer wall portion having a larger width, whereby the difference between the natural frequency of the fluid pipes and the natural frequency of the plate-shaped portion will be larger, and the amplitude of the plate-shaped portion will be smaller, so that the noise can be easily removed by a filter.

In a preferred example of the present invention, the outer wall portion is formed by interconnection of a pair of first portions extending in a direction away from the supporting base and a second portion disposed at a position distant from the supporting base and connecting the pair of first portions.

The outer wall portion having such a shape will have a substantially gate-like shape, thereby achieving a rigid structure in which the frame is less likely to be vibrated.

When the second portion is bent or warped so as to be arranged along the three coils, the second portion of the outer wall portion is disposed in the vicinity of the penetrating portion in which the coils are arranged, so that the rigidity that has become deficient by the penetrating portion can be easily compensated for by the outer wall portion.

With the outer wall portion only, the rigidity against a load from the thickness direction of the outer wall portion is small, so that the mounting portion preferably connects the first portions with each other in the inside of the outer wall portion.

In a preferred example of the present invention, an opening obtained by cutting out the mounting portion is formed in the vicinity of the supporting base, and the mounting portion is not in contact with the supporting base because of the cutting out.

An external turbulence vibration that accords to the environment in which the flowmeter is disposed is transmitted to the supporting base. When this external turbulence vibration is transmitted from the mounting portion to the coils, the detection precision is deteriorated. In contrast, in the present example, an opening is disposed and the mounting portion is not in contact with the supporting base, so that the external turbulence vibration from the supporting base will be difficult to be transmitted to the mounting portion.

In a preferred example of the present invention, the flowmeter further includes a pair of connection members that connects between the pair of fluid pipes at a position between the supporting base and the detectors, for regulating a distance between the pair of fluid pipes at the connection portions, wherein the mounting portion has a cut-out opening so as not to interfere with the pair of connection members.

In this case, since the pair of fluid pipes is connected by the connection member, the external turbulence vibration contained in the vibration of the pair of fluid pipes is likely to be uniform, so that the vibration by the external turbulence is less likely to be detected.

Only the portion of the fluid pipe nearer to the tip end than the portion connected by the connection member is vibrated by the oscillator and, on the other hand, the external turbulence vibration vibrates the whole of the pair of fluid pipes and the supporting base, the natural frequencies of the two vibrations will be different. For this reason, the removal of the external turbulence by the filter will be facilitated.

In a preferred example of the present invention, the frame further has, between the supporting base and the penetrating portions, a second reinforcing portion formed on the mounting portion, enhancing the rigidity of the mounting portion and having a thickness that does not interfere with the pair of fluid pipes.

In this case, the second reinforcing portion formed between the supporting base and the penetrating portion enhances the rigidity of the mounting portion, so that the rigidity of the mounting portion is further enhanced, thereby further improving the measurement precision.

In a preferred example of the present invention, the frame is constituted in such a manner that a pair of leg portions disposed to stand on the supporting base and a beam portion disposed to bridge between the pair of leg portions are integrally formed, and the penetrating portions are formed in the mounting portion at the beam portion.

In this case, an opening is formed between the beam portion and the supporting base, so that the external turbulence vibration from the supporting base is difficult to be transmitted to the mounting portion.

In this case, the beam portion may be formed to have a convex shape. When the beam portion is made to have a convex shape, an outer wall portion is disposed in the vicinity of the penetrating portion where the coils are arranged, so that the strength of the mounting portion in the vicinity of the penetrating portion can be increased.

In a preferred example of the present invention, the supporting base is composed of a member made of metal, and a resin member that is made of a resin having a thick plate shape and serves to weaken transmittance of vibration to the supporting base is disposed on a surface of the supporting base opposite to a surface to which the frame is fixed.

In this case, the external turbulence vibration is made less likely to be transmitted to the supporting base by the resin member, thereby improving the measurement precision.

In a preferred example of the present invention, a cut-out portion for wiring for passing a wiring member connected to the coil through the outer wall portion is formed in the outer wall portion, and a guiding chip for guiding the wiring member penetrating through the cut-out portion in a space inside the outer wall portion and preventing the wiring member from being brought into contact with the fluid pipe is provided.

In this case, the wiring member that has been passed through the cut-out portion is guided by the guiding chip, thereby preventing a situation in which the vibration state fluctuates by the contact of the wiring member to the fluid pipes.

In this case, it is preferable that the guiding chip is integrally formed with the frame such that the guiding chip is connected to at least one of the outer wall portion and the mounting portion.

When the guiding chip is integrally formed such that the guiding chip is connected to at least one of the outer wall portion and the mounting portion, the decrease in the strength of the outer wall portion caused by the cut-out portion can be reinforced.

In a preferred example of the present invention, the flowmeter further includes a bobbin for winding the coil and a yoke for attaching the magnetic substance, wherein a positioning portion for positioning the yoke relative to the bobbin is formed in the bobbin, the fixing portion protrudes to both sides of a thickness direction of the mounting portion, and the fixing portion is provided with an insertion hole for inserting a fastening tool for fastening the fixing portion to the supporting base, where the insertion hole is made to be a long hole capable of moving the frame in the thickness direction.

Such a positioning portion and a long hole will be useful at the time of assembly, thereby achieving the scale reduction of the flow meter.

In a preferred example of the present invention, the pair of fluid pipes includes an inner pipe made of a fluororesin in which inner circumferential surface is in contact with the flow path; and an outer pipe having fibers that are arranged in order to surround an outer circumferential surface of the inner pipe and a resin that is cured in a closely adhering state between the fibers that are arranged in order, and having an elastic modulus larger than that of the inner pipe.

In this example, since the inner pipe of the fluid pipe is formed with a fluororesin, it is difficult to be corroded by chemical substances.

In particular, since the inner pipe is covered with the outer pipe, there is no fear that the chemical substances that have been passed through the inner pipe made of a fluororesin is brought into contact with an ambient gas such as water vapor or ammonia. For this reason, the deterioration of the inner pipe is difficult to proceed, so that the flowmeter will be excellent in chemical resistance.

Since an outer pipe made of a resin and non-metal fibers is disposed on the outside of the inner pipe, there is no fear that the metal ions are eluted.

Since the outer pipe having a large elastic modulus is made of what is known as a fiber reinforced resin in which the resin is cured in a closely adhering state between the fibers, the rigidity of the fluid pipe increases in an outstanding manner as compared with a pipe made of a fluororesin. Moreover, since the fluid pipe is reinforced by the fibers, the change in the elastic modulus by the temperature or the creep phenomenon with lapse of time can be greatly reduced.

For this reason, a measurement that is stable against the temperature change is possible, and the deterioration of the measurement precision with lapse of time can be reduced.

Since the surface of the outer pipe that is reinforced by the fibers has fine unevenness, it will be easy to firmly fix the magnetic substance and other members to the fluid pipe.

EXAMPLES

Example 1

Hereafter, examples of the present invention will be described with reference to the drawings.

Figure 11:
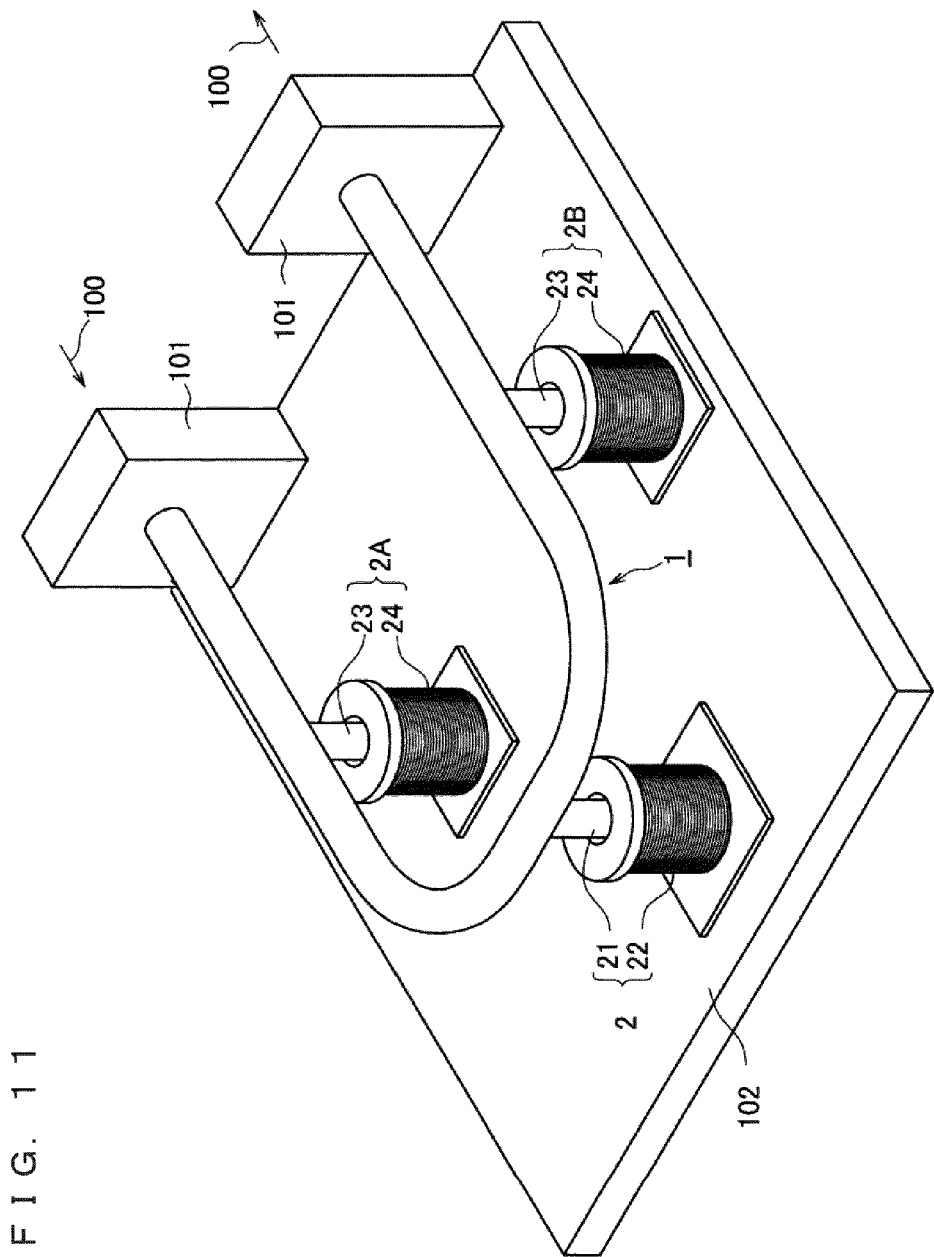
FIG. 11 is a schematic perspective view illustrating a principle of a flowmeter.
Figure 12:
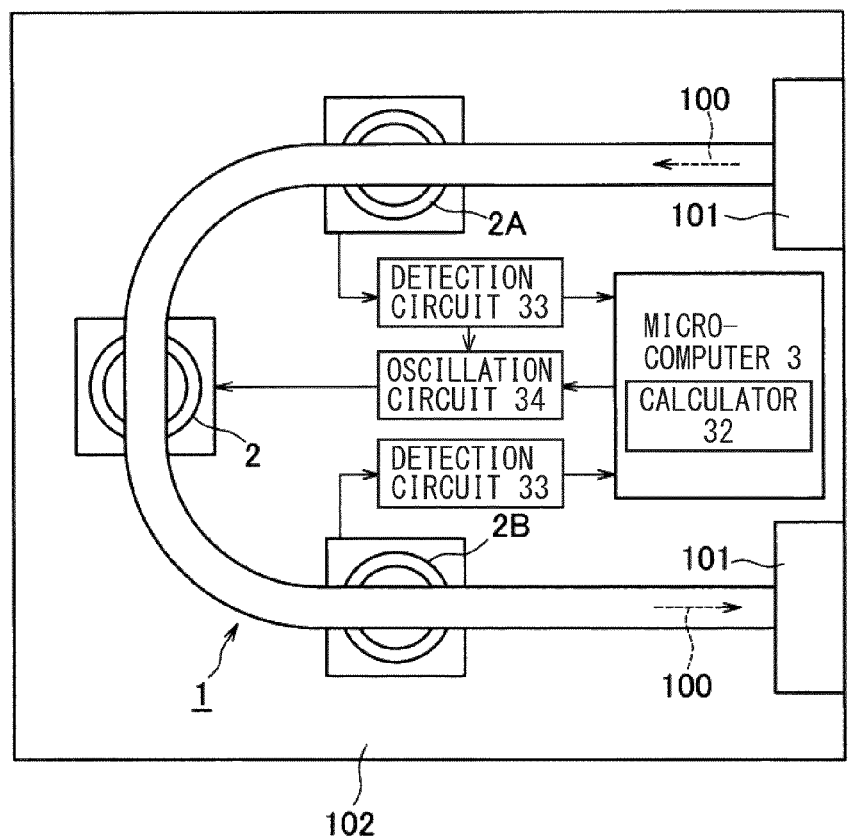
FIG. 12 is a schematic constitutional view illustrating the principle of the flowmeter.
Figure 13A:
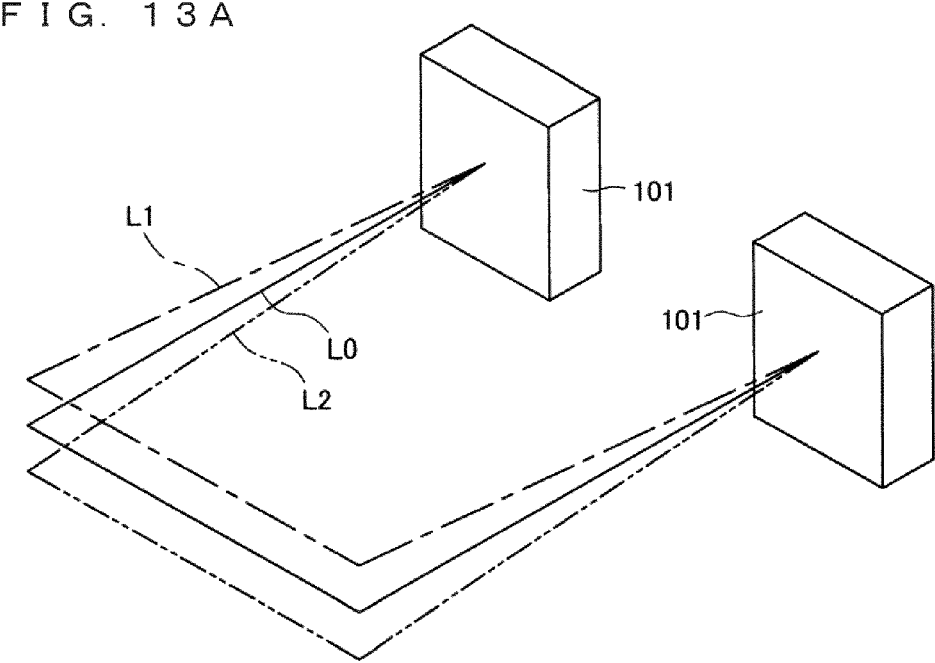
FIGS. 13A and 13B are schematic operation views illustrating the principle of the flowmeter.
Figure 13B:
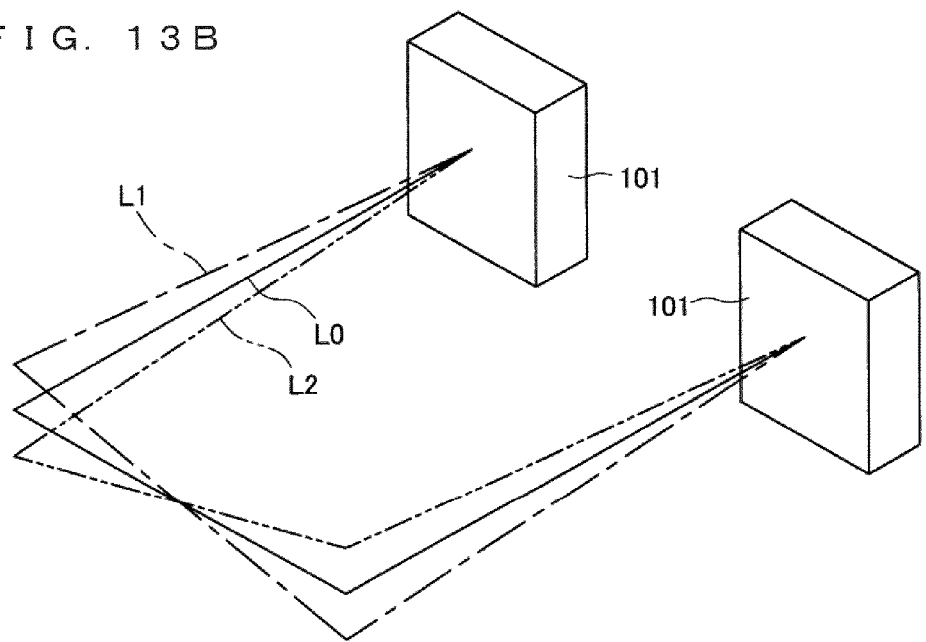

In the following description, the principle and the like of the flowmeter are as described in the examples of FIGS. 11 to 13 and in the above-mentioned three patent documents. In the following description, mainly the structure of the frame and the structure of mounting the coils will be described.

As shown in FIG. 1, the present flowmeter includes a pair of fluid pipes 1, a frame 3, and a supporting base 4. The frame 3 and the supporting base 4 are each made of a metal member such as aluminum or stainless steel, and the frame 3 is fixed to the supporting base 4.

As shown in FIGS. 2A and 2B, a resin member 5 that is made of a resin having a thick plate shape and serves to weaken transmittance of vibration to the supporting base 4 is disposed on a surface of the supporting base 4 opposite to a surface to which the frame 3 is fixed.

A pipe portion 7 is disposed on a surface of the resin member 5 opposite to the surface to which the supporting base 4 is fixed.

A flow path that is in communication with the fluid pipe 1 and is not illustrated is formed in the supporting base 4, the resin member 5, and the pipe portion 7 shown in FIG. 2B. A measurement fluid 100 shown by an arrow that has flowed in from one end of the pipe portion 7 passes through the flow path within the resin member 5 and the supporting base 4 and, after being introduced into the fluid pipe 1, passes through the supporting base 4 and the resin member 5 again to flow out from the other end of the pipe portion 7.

Figure 3A:
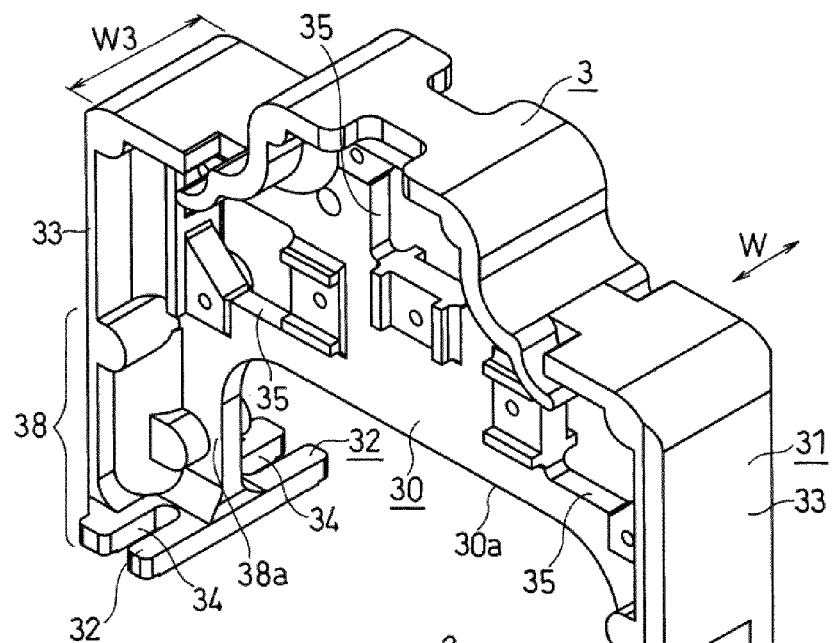
FIG. 3A is a schematic perspective view illustrating a frame.
Figure 3B:
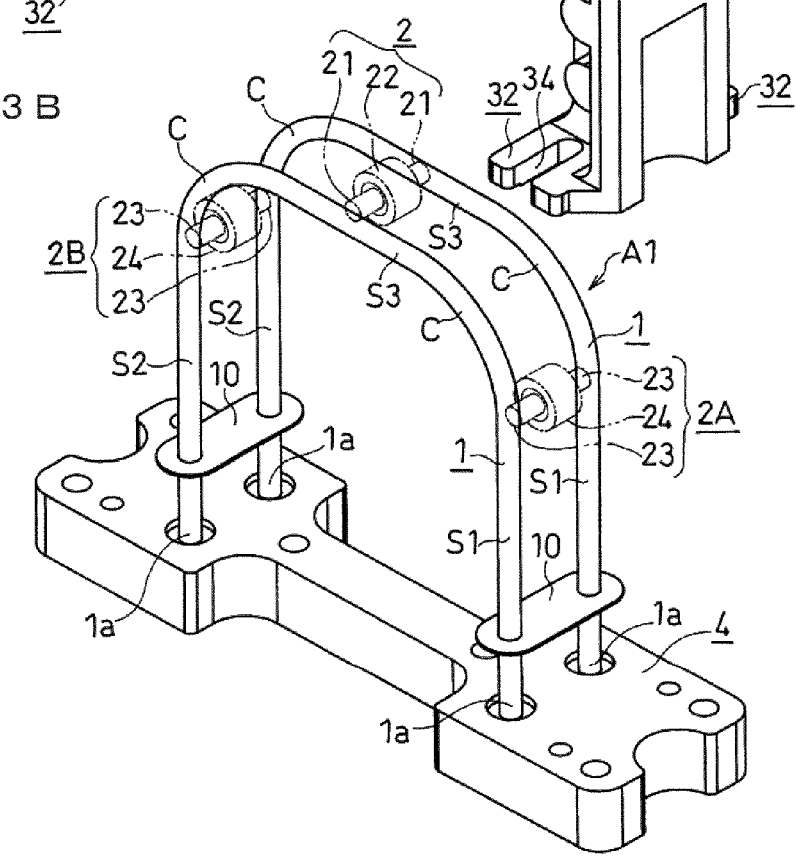
FIG. 3B is a schematic perspective view illustrating a fluid pipe and a supporting base.

Fluid Pipe 1:

The pair of fluid pipes 1 that forms the flow path of the measurement fluid 100 is formed to have, for example, a substantially reverse U shape and is arranged to have a substantially equal shape and equal size with each other and to be substantially mirror-symmetric (plane symmetry) and parallel, as shown in FIG. 3B. An end 1a of the fluid pipes 1 is mounted on the supporting base 4, and the fluid pipes 1 are supported to be capable of being vibrated by the supporting base 4.

A manifold not illustrated in the drawings is formed in the pipe portion 7 of FIG. 2B, and the measurement fluid 100 that has been introduced from one end of the pipe portion 7 is introduced into a first straight pipe S1 of the pair of fluid pipes 1, and passes through a bent portion C, a third straight pipe portion S3, a bent portion C, and a second straight pipe portion S2 to be ejected from the other end of the pipe portion 7.

Frame 3:

As shown in FIG. 3A, the frame 3 is constituted in such a manner that a mounting portion 30, a first reinforcing portion 31 and a fixing portion 32 are integrally formed. The frame 3 is fixed to the supporting base 4 of FIG. 3B via the fixing portion 32.

First Reinforcing Portion 31:

The first reinforcing portion 31 shown in FIG. 3A is arranged around the outer circumference of the mounting portion 30 to enhance the rigidity of the mounting portion 30, and has an outer wall portion 33 that surrounds substantially continuously the outer circumference of the fluid pipes 1 by protruding, for example, to both sides of the thickness direction W of the mounting portion 30.

Figure 4A:
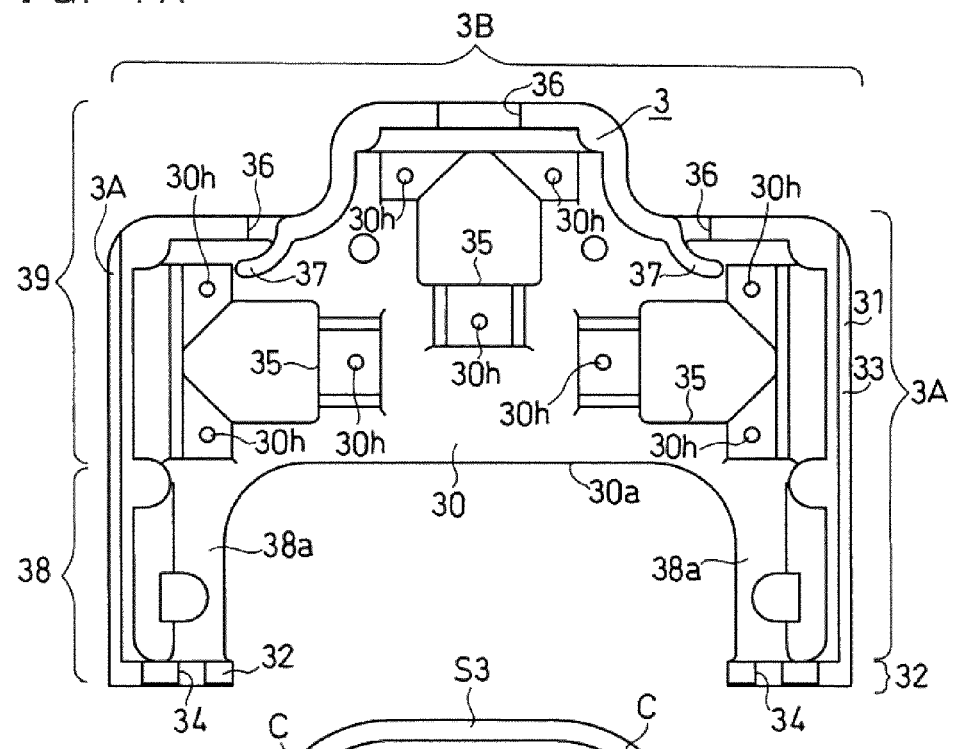
FIG. 4A is a schematic front view illustrating the frame 3.
Figure 4B:
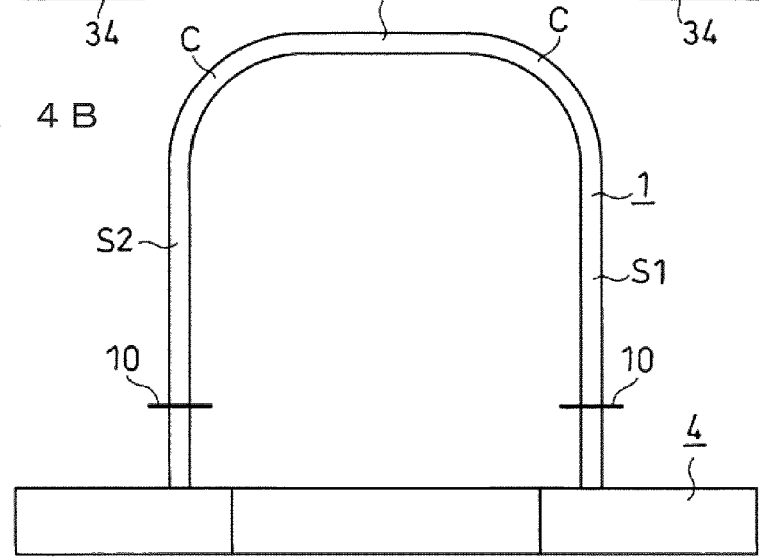
FIG. 4B is a schematic front view illustrating the fluid pipe and the supporting base.

Outer Wall Portion 33:

As shown in FIG. 4A, the outer wall portion 33 is formed by interconnection of a pair of first portions 3A extending in a direction away from the supporting base 4 and a second portion 3B disposed at a position distant from the supporting base 4 and connecting the pair of first portions 3A. That is, the outer wall portion 33 is formed to have a substantially gate-like shape. The mounting portion 30 connects the first portions 3A with each other in the inside of the outer wall portion 33.

In the outer wall portion 33, the second portion 3B is bent and formed as shown in FIG. 4A so as to be arranged along the three coils 22, 24, 24 shown by virtual lines of FIG. 3B. In the present example, the second portion 3B is bent and formed so as to protrude upwards while being arranged along the coil 22 (FIG. 3B) of the oscillator 2. Here, the second portion 3B may be formed to have a straight line shape.

The frame 3 is constituted in such a manner that a pair of leg portions 38 disposed to stand on the supporting base 4 (FIG. 2B) and a beam portion 39 disposed to bridge between the pair of leg portions 39 are integrally formed, and a through-hole (one example of the penetrating portions) 35 is formed in the mounting portion 30 at the beam portion 39. The beam portion 39 is formed to have a convex shape at a position corresponding to the second portion 3B. Therefore, the outer wall portion 33 is disposed in the vicinity of the through-hole 35, whereby the strength can be increased.

Here, the leg portions 38 are constituted in such a manner that a part of the first reinforcing portion 31 of FIG. 3 and the plate portion 38 connected to the mounting portion 30 are formed to extend upwards from the fixing portion 32.

Figure 7A:
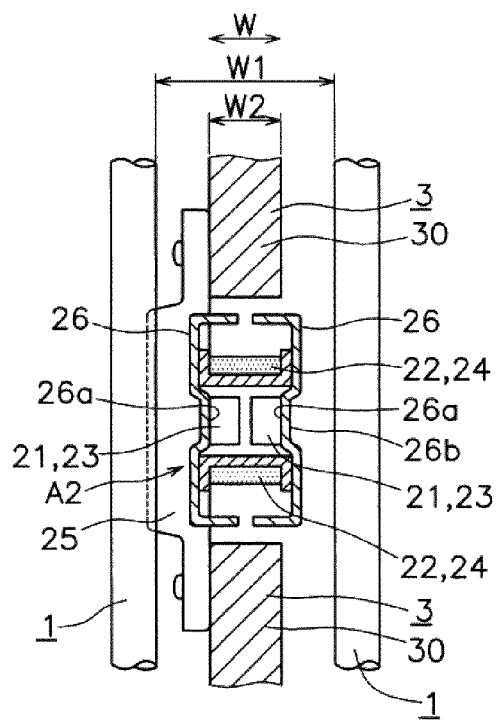
FIGS. 7A to 7C are schematic cross-sectional views illustrating a method for mounting the bobbin and the yoke.

Mounting Portion 30:

As shown in FIGS. 1 and 3, the mounting portion 30 is disposed between the pair of fluid pipes 1, and is formed to have a thickness that does not interfere with the pair of fluid pipes 1. As shown in FIG. 7A, the mounting portion 30 is made of a plate-shaped plate portion (one example of the mounting portion 30) having a thickness smaller than the distance W1 between the pair of fluid pipes 1, and the width W3 of the outer wall portion 33 of FIG. 1 relative to the thickness direction W is larger than the distance W1 (FIG. 7) between the pair of fluid pipes 1. That is, the outer wall portion 33 surrounds the outer circumference of the pair of fluid pipes 1 in a substantially continuous manner.

Opening 30a:

As shown in FIG. 1, the mounting portion 30 is largely cut out in the vicinity of the supporting base 4, and this forms an opening 30a in the frame 3. Since the opening 30a is formed, the mounting portion 30 is not in contact with the supporting base 4.

Oscillator 2 and Detectors 2A, 2B:

In the present flowmeter, an oscillator 2 and a plurality of detectors 2A, 2B are provided.

The oscillator 2 is for oscillating the fluid pipes 1, and includes a coil 22 and a pair of magnetic substances 21 made of a permanent magnet shown by the virtual lines of FIG. 3B.

The detectors 2A, 2B shown in FIG. 2B are disposed and spaced apart from each other along the flow path of the fluid pipes 1, and detect the state of vibration of the fluid pipes 1. Each of the detectors 2A, 2B includes a coil 24 and a pair of magnetic substances 23 made of a permanent magnet shown by the virtual lines of FIG. 3B.

The coils 22, 24 are fixed to the mounting portion 30 (FIG. 2) via a bobbin 25 described below shown in FIG. 5. On the other hand, the magnetic substances 21, 23 are fixed to the fluid pipes 1 with use of a band 27 via a yoke 26.

The present flowmeter is provided with a calculator (See FIG. 12) that calculates a mass flow rate of the measurement fluid that passes through the flow path of the fluid pipes 1 based on the vibrations that are detected by the plurality of detectors 2A, 2B shown in FIG. 3B.

Through-Holes 35:

As shown in FIG. 4A, the through-holes 35 are formed at three positions. The through-holes 35 are for disposing the coils 22, 24 respectively corresponding to the magnetic substances 21, 23 that are mounted on the fluid pipes 1 shown in FIG. 3B. Three screw insertion holes 25$h$ are formed in the bobbin 25 of FIG. 5. On the other hand, female screw holes 30$h$ are formed in the mounting portion 30 of FIG. 4A. As shown enlarged in FIG. 6, the bobbin 25 is fixed to the part of the through-hole 35 of the mounting portion 30 with the screws 25$b$ that have been inserted into the screw insertion holes 25$h$.

Cut-Out Portion 36 and Guiding Chip 37:

As shown in FIG. 1, four cut-out portions 36 for wiring for passing a wiring member 6 (partly illustrated in the drawings) connected to the coils 22, 24 (FIG. 3) are formed in the outer wall portion 33. On the other hand, the first reinforcing portion 31 includes a guiding chip 37, and the guiding chip 37 is connected to the mounting portion 30 and the outer wall portion 33. The guiding chip 37 guides the wiring member 6 inserted through the cut-out portion 36 in a space inside the outer wall portion 33 and prevents the wiring member 6 from being brought into contact with the fluid pipes 1.

The shape of the outer wall portion 33 is mirror-symmetric relative to the width direction W and the flow direction. The cut-out portion 36 is disposed in the outer wall portion 33 to be mirror-symmetric relative to the width direction W and the flow direction.

Figure 5:
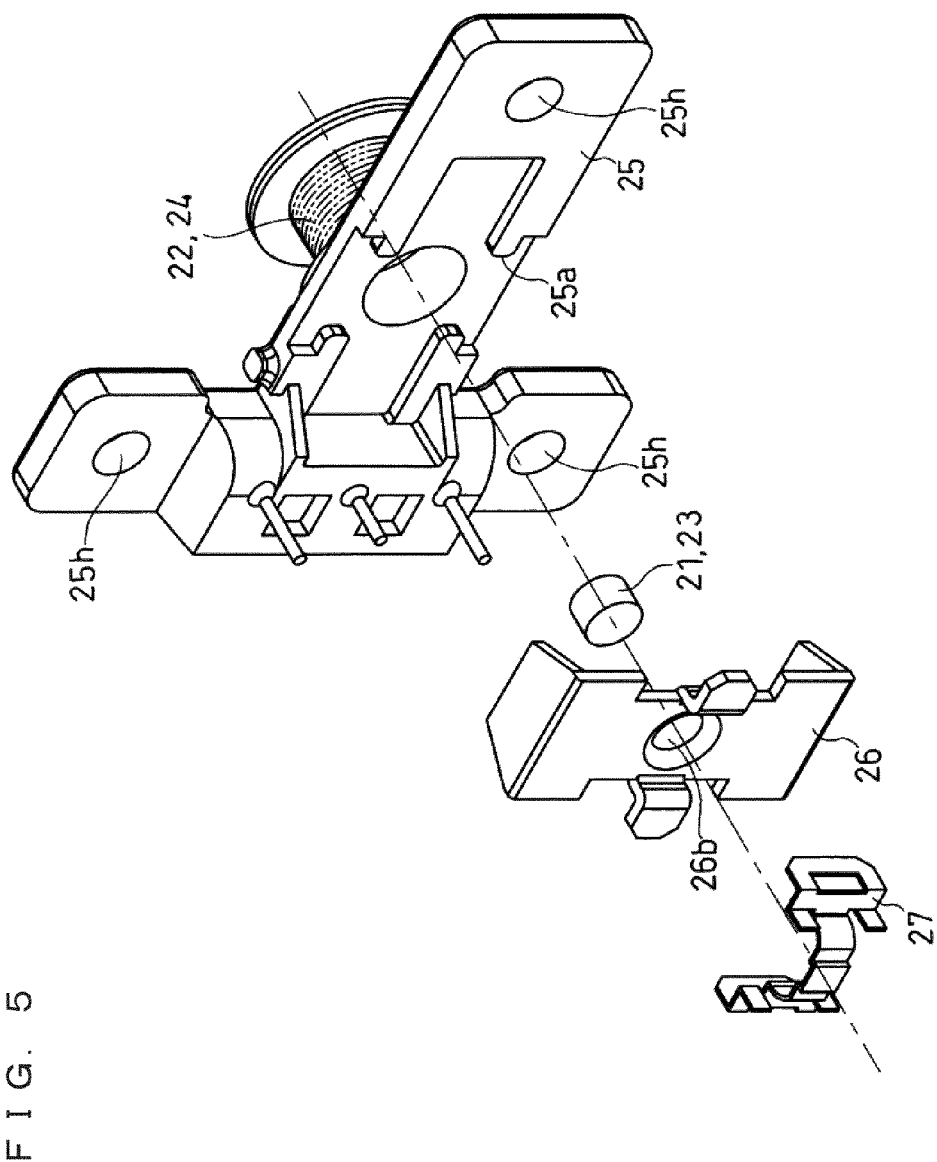
FIG. 5 is an enlarged exploded perspective view illustrating a bobbin and a yoke.

Bobbin 25 and Yoke 26:

As shown in FIG. 5, the coils 22, 24 are wound around the bobbin 25, and the magnetic substances 21, 23 are bonded to a convex portion 26$a$ (FIG. 7A) of the yoke 26. In order to fix the magnetic substances 21, 23 to the fluid pipes 1 of FIG. 6, the fluid pipes 1 are sandwiched and fixed between the yoke 26 and the band 27 after bonding with an adhesive B (FIG. 7) having high adhesiveness that is filled in a recess 26$b$ of the yoke 26.

In the bobbin 25 of FIG. 5, a positioning portion 25$a$ for positioning the yoke 26 relative to the bobbin 25 in two directions, that is, the horizontal direction and the vertical direction, is formed. The positioning portion 25$a$ is formed at a shallow recess that is arranged along the outer shape of the yoke 26.

Here, the positioning portion 25$a$ may be formed in an I shape or the like, and the yoke 26 may be formed to have a shape that is fitted into the shape.

As shown in FIG. 1, the fixing portion 32 is formed to protrude on both sides of the mounting portion 30. The fixing portion 32 is fastened to the supporting base 4, for example, by a fastening tool 8 made of a bolt. In the fixing portion 32, an insertion hole 34 for inserting the fastening tool 8 is formed.

The insertion hole 34 is made to be a long hole capable of moving the frame 3 in the thickness direction W. By loosening the fastening tool 8, the frame 3 can be slidingly moved in the thickness direction W relative to the supporting base 4.

Here, as the insertion hole 34, a plurality of holes may be formed instead of the long hole.

Assembly Method:

Next, a method for assembling the mechanical parts of the present flowmeter will be described.

A fluid pipe assembly A1 obtained by integrating a pair of connection members 10, 10, a pair of fluid pipes 1, 1, and a supporting base 4 of FIG. 3 described below is prepared in advance. On the other hand, a bobbin assembly A2 is prepared in which a pair of yokes 26 and magnetic substances 21, 21 (23, 23) are positioned relative to the bobbin 25 of FIG. 7A. Here, the bobbin assembly A2 is provisionally fixed to the bobbin 25 by attraction of the magnetic substances 21, 21 (23, 23) with each other by a magnetic force.

First, the bobbin assembly A2 is fixed to the mounting portion 30, and next, the fluid pipe assembly A1 of FIG. 3B is provisionally fixed to the frame 3 of FIG. 3A. That is, the frame 3 is inserted from above between the pair of fluid pipes 1, 1 of the fluid pipe assembly A1 of FIG. 3, and further, the fastening tool 8 is screwed to such a degree that the frame 3 may not be fixed by the fastening tool 8 of FIG. 1, thereby obtaining a provisionally assembled state of FIG. 7A.

Figure 7B:
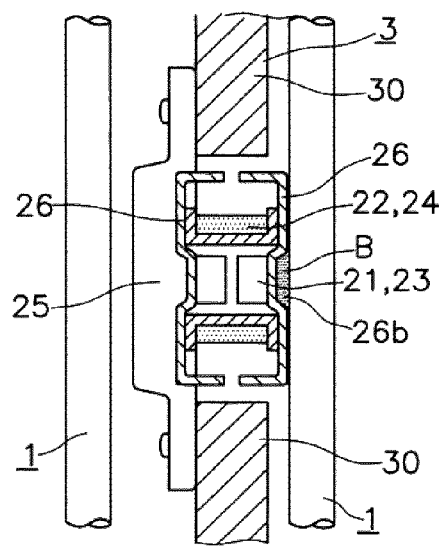
Figure 7C:
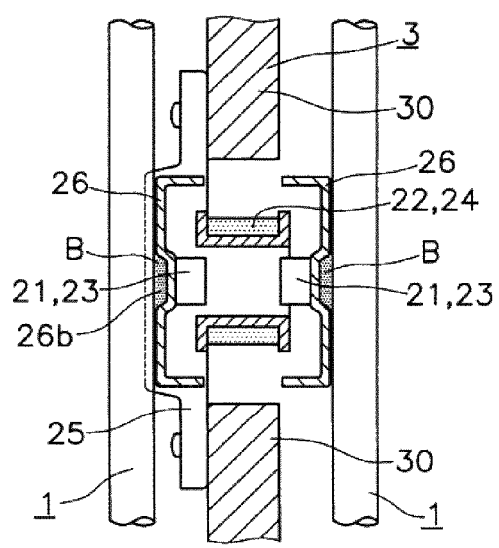

In the provisionally assembled state, the frame 3 of FIG. 1 is slidingly moved slightly in one direction of the thickness direction W relative to the supporting base 4, and one yoke 26 is brought into contact with the fluid pipe 1 as shown in FIG. 7B, and the other yoke 26 is fixed to one fluid pipe 1 with the adhesive B.

By the movement, a gap between the mounting portion 30 and the other fluid pipe 1 of FIG. 7B is widened. A jig not illustrated in the drawings is inserted into this gap, and the provisionally fixed yoke 26 is moved parallel in a predetermined direction of the horizontal direction relative to the other fluid pipe 1, and the yoke 26 is provisionally fixed to the fluid pipe 1 with the adhesive B.

Thereafter, when the frame 3 of FIG. 1 is moved slightly in the other direction of the thickness direction W, the pair of fluid pipes 1, 1 will be arranged at positions that are mirror-symmetric with each other with the mounting portion 30 located at the center. Thereafter, as shown in FIG. 6, the yoke 26 is fixed to the fluid pipes 1 with the band 27, and the fastening tool 8 of FIG. 1 is fastened to fix the frame 3 to the supporting base 4.

Figure 6:
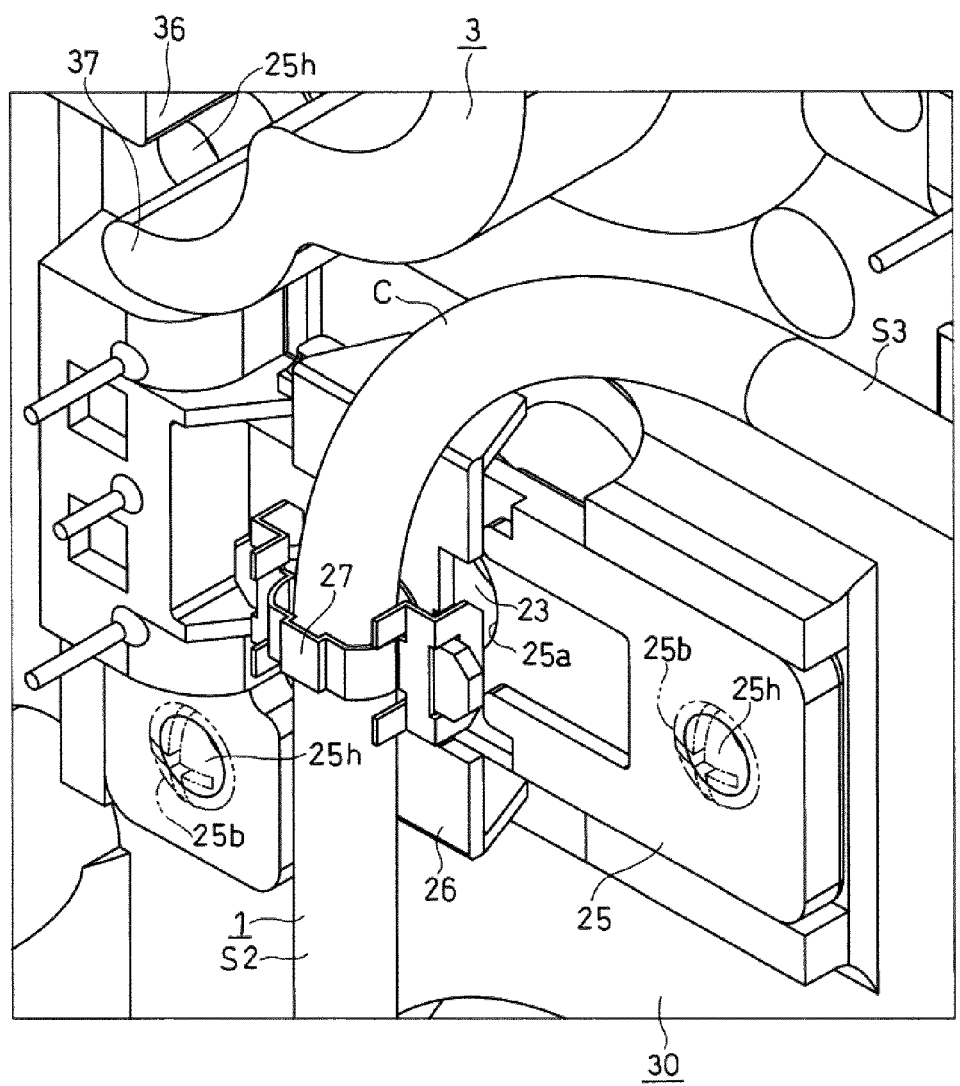
FIG. 6 is an enlarged schematic perspective view illustrating a mounted state of the bobbin and the yoke.

Here, when the diameter of the fluid pipes 1 is small, the weight of the yoke 26 of FIG. 6 greatly affects the detected value, so that the magnetic substance 23 (21) may be fixed to the fluid pipes 1 via a resin blanket without using the yoke 26.

Connection Members 10:

As shown in FIG. 3, the connection members 10 connect between the pair of fluid pipes 1 at a position between the supporting base 4 and the detectors 2A, 2B, and regulate the distance between the pair of fluid pipes 1 at the connected part. Here, the opening 30a is cut out so as not to interfere with the pair of connection members 10.

Figure 8A:
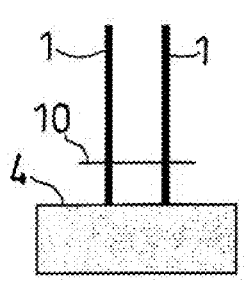
FIGS. 8A to 8C are conceptual views illustrating a fluid pipe when a connection member according to the present invention is used.
Figure 8B:
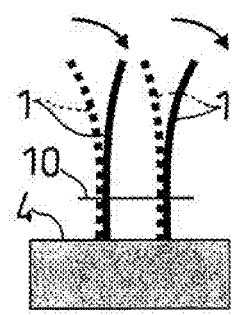
Figure 8C:
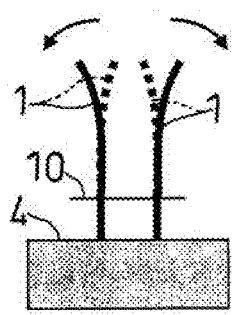
Figure 8D:
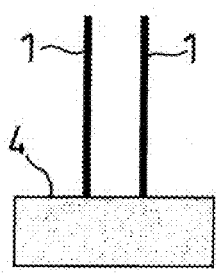
FIGS. 8D to 8F are conceptual views illustrating a fluid pipe when the connection member is not used.
Figure 8E:
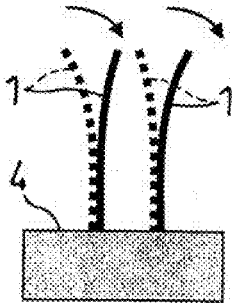
Figure 8F:
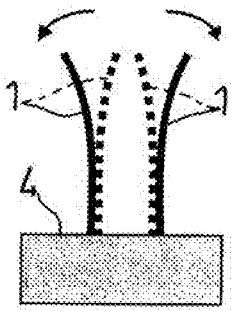

As shown in FIGS. 8C and 8F, when the fluid pipes 1 are oscillated by the oscillator 2, the fluid pipes 1, 1 will undergo a "reverse phase vibration" of vibrating in directions opposite to each other (in mirror symmetry). By such a reverse phase vibration, the counter force generated in the mounting portion 30 will be extremely small (theoretically, no counter force is generated).

On the other hand, as shown in FIGS. 8B, 8E, in the case of an external turbulence vibration, the whole of the fluid pipes 1, the supporting base 4, and the like are vibrated, so that the fluid pipes 1, 1 basically undergo an "equal phase vibration" of vibrating in the same directions with each other. Theoretically, as to the equal phase vibration, it will not be detected because the two vibrations are cancelled with each other by taking the difference of the two detectors 2A, 2B. However, asymmetricity is practically generated due to propagation damping, propagation delay, or the like, so that it will not be a strict "equal phase vibration".

Therefore, as shown in FIGS. 8A and 8B, by connecting the two fluid pipes 1, 1 with use of connection members 10, the vibration state of the fluid pipes 1 will be more positively approximated to the "equal phase vibration" against the external turbulence vibration, as shown in FIG. 8B. By action of the connection members 10, the natural frequency to the vibration by the oscillator 2 (natural frequency relative to the reverse phase vibration) and the natural frequency to the external turbulence vibration (natural frequency relative to the equal phase vibration) are made different from each other, thereby outstandingly raising an effect of removing the external turbulence vibration by the filter.

Other Examples

FIGS. 9 and 10 show other examples. In the other examples described below, only the parts different from the above-described Example 1 will be described.

Figure 9A:
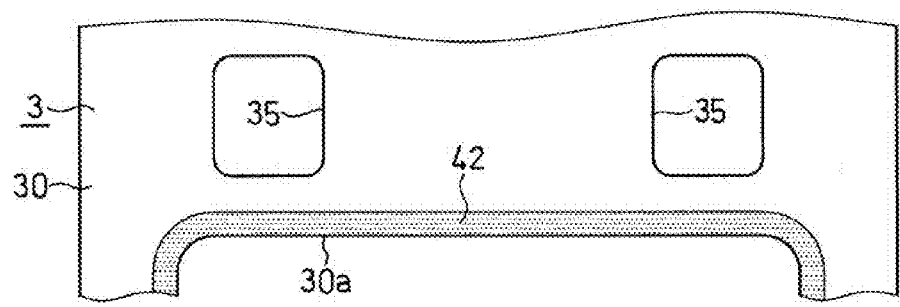
FIGS. 9A to 9D are schematic front views illustrating a frame according to other examples.
Figure 9B:
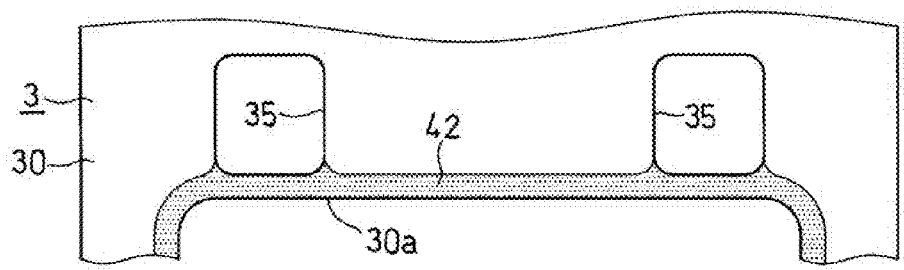

As shown in FIGS. 9A and 9B, a second reinforcing portion 42 is formed in the frame 3 between the supporting base 4 (FIG. 1) and the through-hole 35. The second reinforcing portion 42 enhances the rigidity of the mounting portion 30, and is made of a protrusion having a thickness that does not interfere with the pair of fluid pipes 1 (FIG. 1) and being thicker than the mounting portion 30.

Figure 9C:
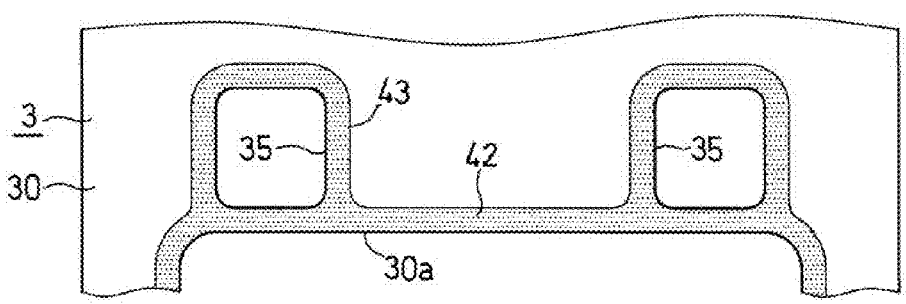

In the example shown in FIG. 9C, another reinforcing portion 43 is formed around the through-hole 35.

Figure 9D:
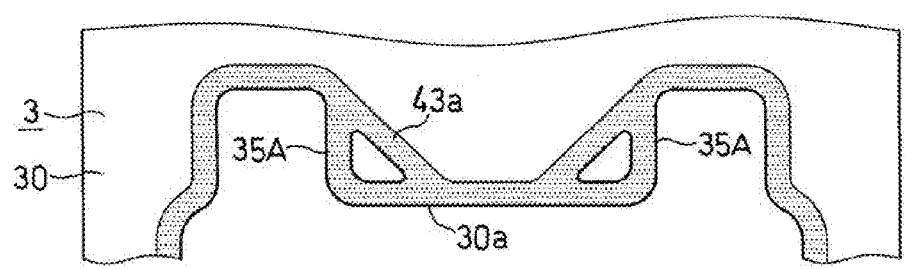

As shown in FIG. 9D, the penetrating portion may be formed with a cut-out portion 35A that is connected to the opening 30a. In the frame 3, a protrusion serving as a reinforcing section 43a for reinforcing the cut-out portion 35A is provided. The reinforcing section 43a is formed with a protrusion having a thickness that does not interfere with the fluid pipes 1 (FIG. 1) and being arranged along the lower fringe of the mounting portion 30.

Here, in FIG. 9, net-like points are drawn at the site of the protrusion.

Figure 10A:
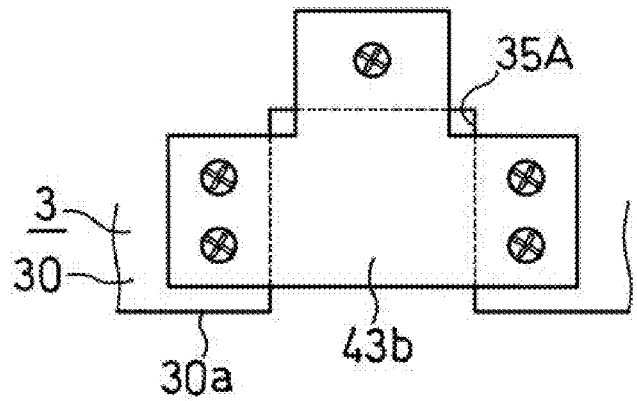
FIGS. 10A to 10C are schematic front views and a schematic perspective view illustrating a frame according to other examples.
Figure 10B:
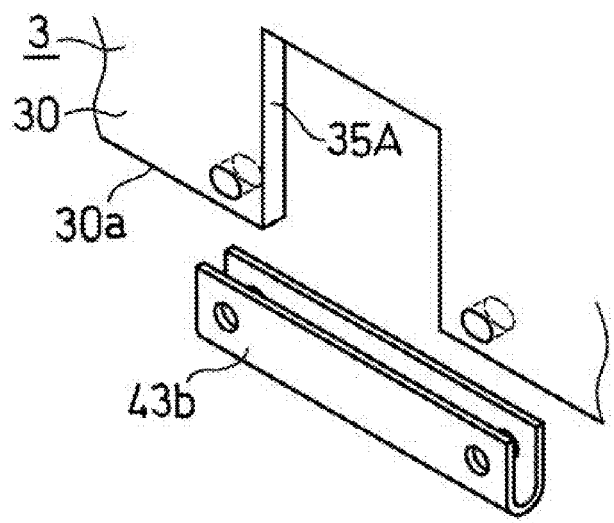
Figure 10C:
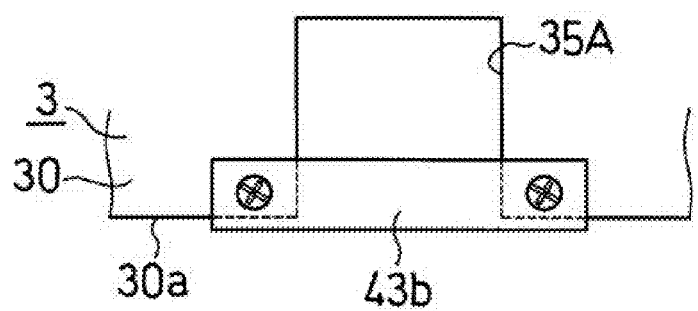

As shown in FIG. 10, the reinforcing section for reinforcing the cut-out portion 35A may be formed as a body separate from the frame 3. For example, as shown in FIG. 10A, the reinforcing section 43b may be formed with a part of the bobbin that is disposed to override the cut-out portion 35A, or alternatively, as shown in FIGS. 10B and 10C, the reinforcing section 43b may be formed with a member having a substantially U shaped cross section that links the lower part of the cut-out portion 35A.

Other Examples

FIGS. 14 to 25 show other examples.

Figure 14A:
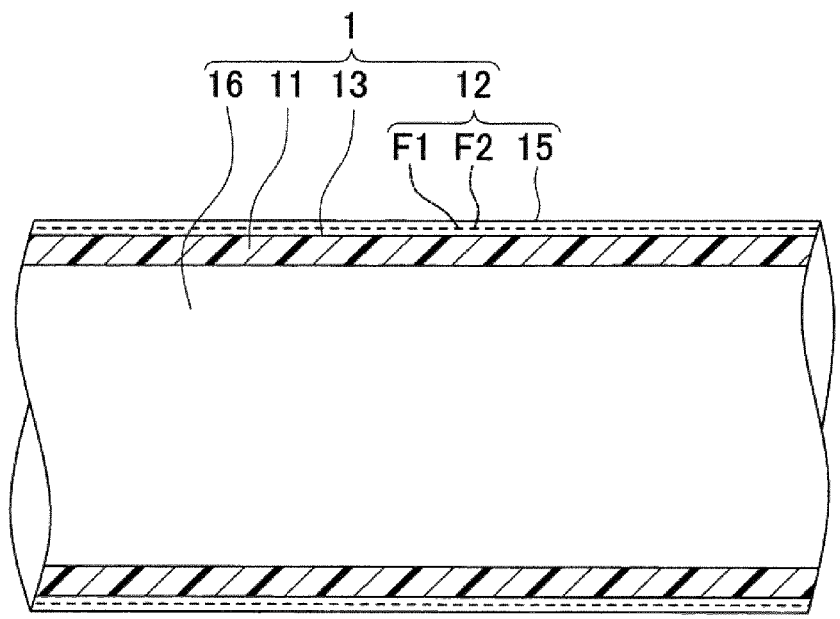
FIG. 14A is an enlarged cross-sectional view of a fluid pipe according to another example of the present invention.

In FIG. 14A, the fluid pipe 1 is made of an inner pipe 11 that is in contact with the flow path 16 and an outer pipe 12 that is laminated on the outer circumferential surface of the inner pipe 11. The inner pipe 11 is made of fluororesin, and is formed by extrusion molding.

The outer pipe 12 is made, for example, by winding and curing a prepreg in which glass fibers are arranged in an uncured epoxy resin around the outer circumference of the inner pipe 11, and has an elastic modulus larger than that of the inner pipe 11. That is, the outer pipe 12 has fibers F 1, F2 that are arranged in order on the outer circumferential surface of the inner pipe 11 and a resin (matrix) 15 for fixing the fibers F1, F2 onto the inner pipe 11 or forming the fibers F1, F2 in a manner capable of being pressed and fixed. Here, the uncured epoxy resin includes, for example, those having low fluidity, that is, those in a so-called semi-cured state. Regarding the epoxy resin in a semi-cured state (uncured), the resin is softened to improve the processability by keeping the temperature to be higher than ordinary temperature and lower than the curing temperature. The epoxy resin in a semi-cured state is a thermosetting resin, so that it will be brought into a completely cured state by keeping the temperature to be higher than a predetermined curing temperature. This curing temperature is lower than the maximum continuous use temperature of the fluororesin constituting the material of the inner pipe 11. Accordingly, the outer pipe 12 can be formed while maintaining the shape of the inner pipe 11. On the other hand, a temperature for allowing a thermoplastic resin to have fluidity is higher than the maximum continuous use temperature of the fluororesin, so that it is difficult to form the outer pipe 12 by injection molding or the like on the molded inner pipe 11.

Figure 18:
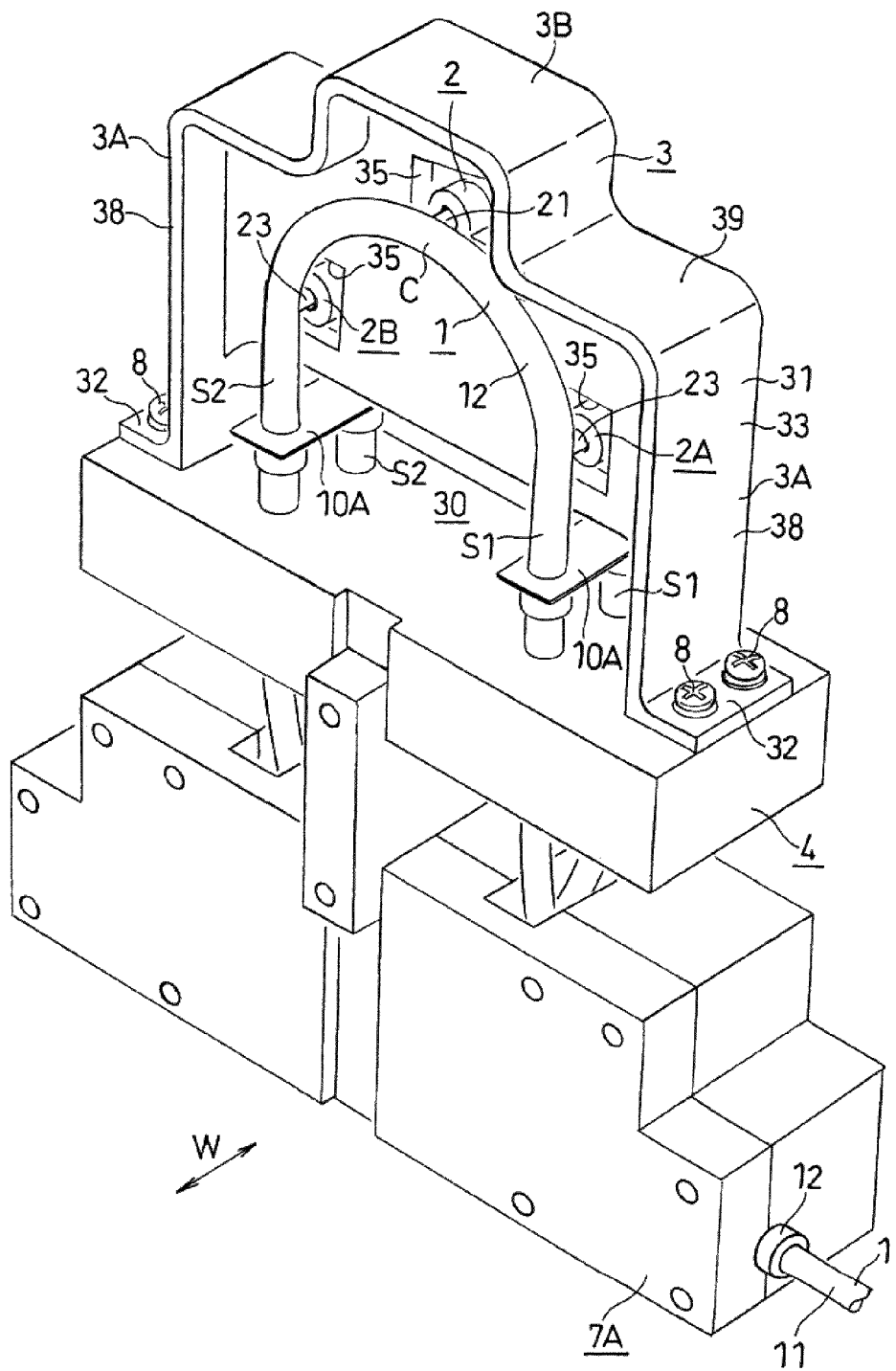
FIG. 18 is a schematic perspective view illustrating a flowmeter according to another example.

The fibers F1, F2 and the resin 15 are in a state of covering and surrounding the inner pipe 11. The permanent magnets 21, 23 of FIG. 18 are fixed to the outer pipe 12 (FIG. 14A) via a fixing tool.

In the present example, for example, as shown in FIG. 14B and FIGS. 17A, 17B, 17C, the fibers F are assembled in a weave form that surrounds the outer circumference of the inner pipe 11, and the resin 15 of FIG. 14A is cured between the fibers F that are assembled in a weave form in a state of being in close adhesion to the fibers F. Here, in the present example, a satin weave of FIG. 17A is adopted, and the fibers F1, F2 extending in the first and second spiral directions that intersect with each other are assembled in a weave form.

Figure 15:
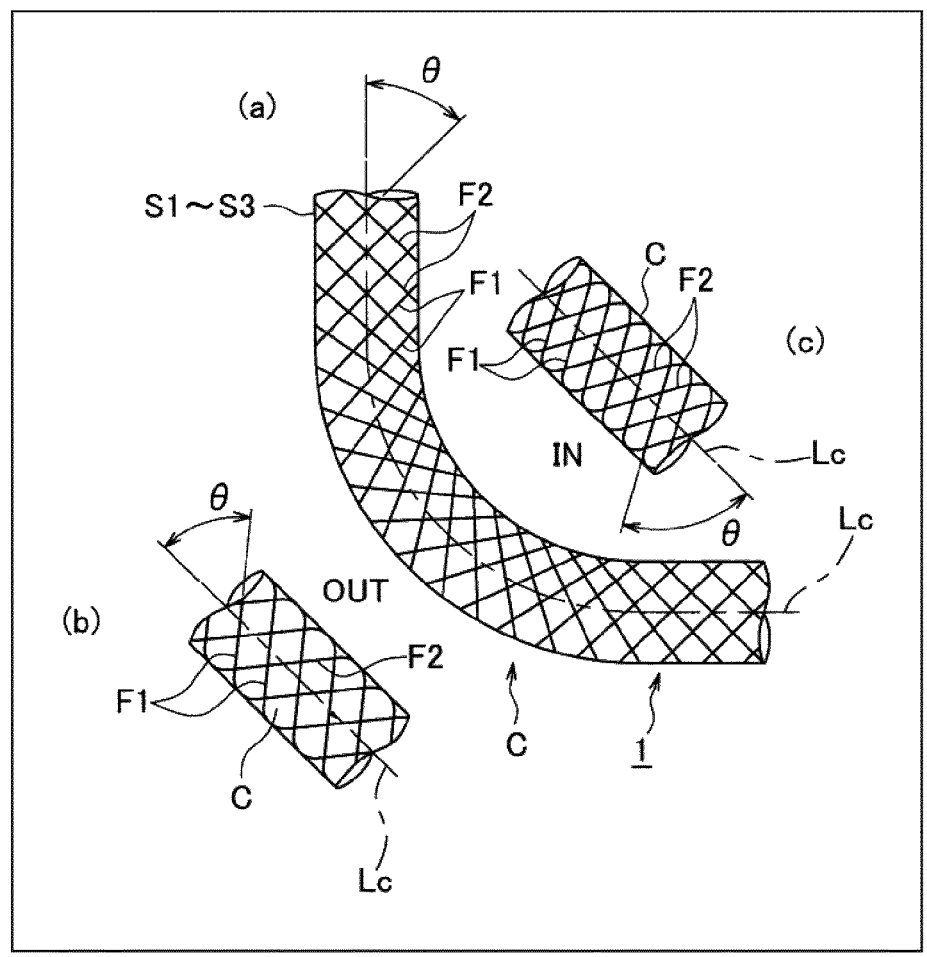
FIG. 15A to 15C are model views illustrating the orientation and the bulk density of fibers at a bent portion, where

In the present example, all of the straight-pipe portions S1 to S3 and the bent portion C of FIG. 15 are formed with the inner pipe 11 and the outer pipe 12. In the straight-pipe portions S1 to S3 and the bent portion C, as shown in FIG. 15A, the longitudinal direction of the fibers F is set to be oblique relative to the axial line Lc of the fluid pipes 1.

On the other hand, in the straight-pipe portions S1 to S3 and the bent portion C, there are no fibers that are arranged such that the longitudinal direction of the fibers F will be along the axial line Lc of the fluid pipes 1.

In the present example, the production method is not particularly limited. However, as a method for producing the fluid pipes 1, an example will be described in which the sheet winding technique is adopted.

First, sheets of prepreg are wound around the inner pipe 11 of FIG. 14A so as to attain a predetermined thickness. In this state, the temperature is raised up to a temperature at which the epoxy resin of the prepreg will have a lower viscosity. Thereafter, premolding is carried out for manually bending it into a U shape.

During this preliminary molding, the pipe is elongated in the outer side OUT of the bent portion C of FIG. 15A, and on the other hand, the pipe is contracted in the inner side IN of the bent portion C. In order to meet the elongation in the outer side OUT, the fibers F1, F2 move within the uncured resin, whereby the orientation angle θ (the angle formed by the axial line Lc and the fibers F1, F2) will be small in the outer side OUT shown in FIG. 15B, and on the other hand, the orientation angle θ will be large in the inner side IN in order to meet the contraction of the inner side IN shown in FIG. 15C.

Figure 16:
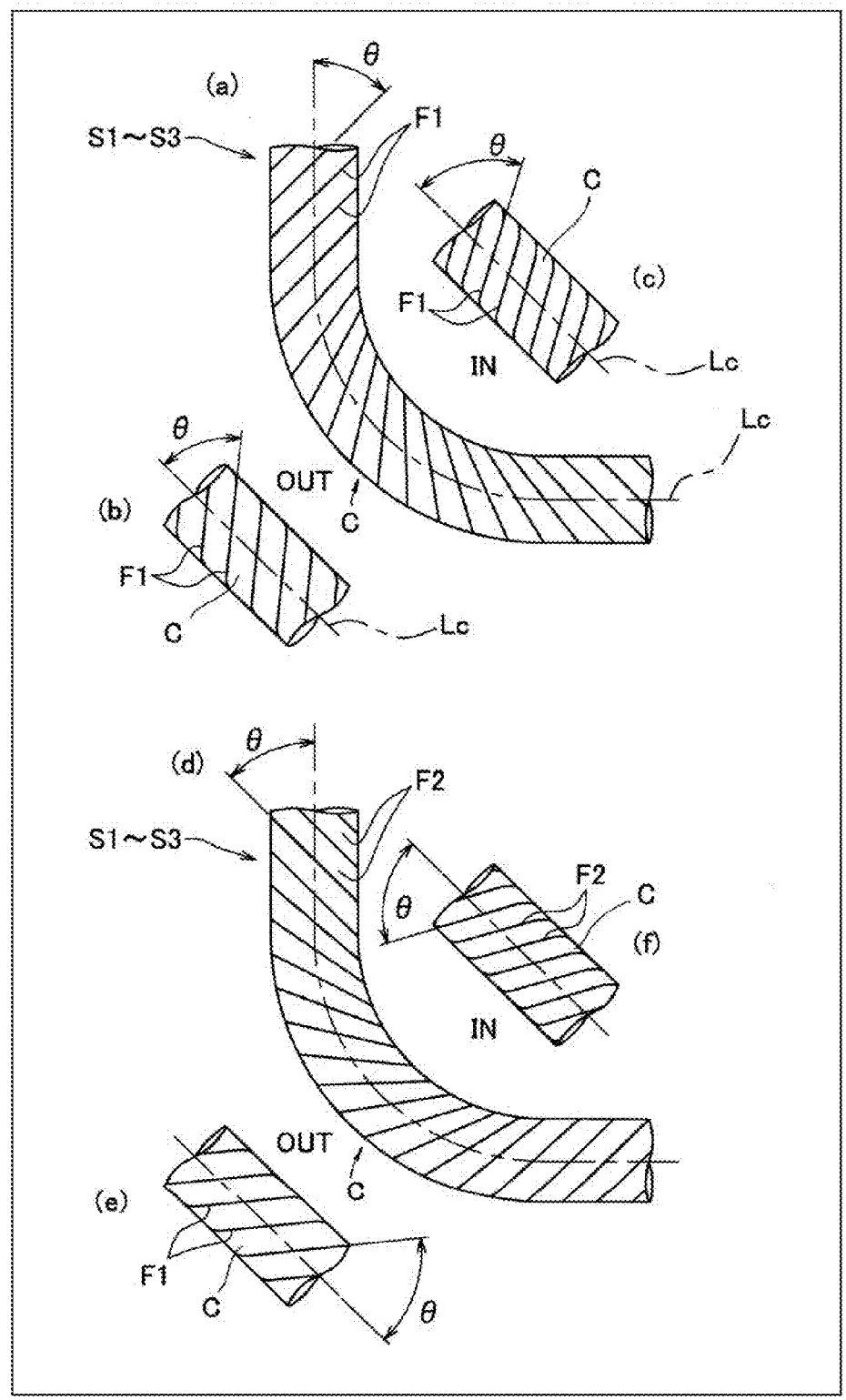
FIGS. 16A and 16D are plan views of the same.
FIGS. 16B and 16E are outer side views of the same.
FIGS. 16C and 16F are inner side views of the same.

In accordance with such a change in the orientation angle θ, as will be understood from FIGS. 16 and 15, at the bent portion C, the number of the fibers F1, F2 in the inner side IN of the bent portion C per unit surface area will be larger than the number of the fibers F1, F2 in the outer side OUT of the bent portion C per unit surface area.

After the above preliminary molding, the pipe bent in a U shape is set in a mold, and pressurized and heated for a predetermined period of time in a clamped state, so as to cure the sheets of prepreg. After the curing, the pipe is taken out from the mold.

By the above pressurizing force, the fibers of the outer pipe 12 of FIG. 14A will be shaped to press the outer circumferential surface 13 of the inner pipe 11, and are fixed with the epoxy resin so as to maintain the shape of pressing the outer circumferential surface 13. As a result, the state in which the inner pipe 11 and the outer pipe 12 are integrated will be stabilized. That is, the friction force generated between the inner pipe 11 and the outer pipe 12 increases, thereby preventing the escape or slippage of the inner pipe 11.

Meanwhile, in the present example, in order to facilitate the drawing, the orientation angle θ in the straight pipe portions S1 to S3 is set to be 45° and illustrated. However, it is sufficient that the orientation angle θ is not 0° or 90° at the bent portion C, and the orientation angle θ may be an angle capable of allowing the movement of the fibers F1, F2 when the pipe is bent.

In the above example, the fibers F1, F2 assembled in a fabric form are adopted. However, the fibers F1, F2 which are arranged in parallel respectively in different prepregs may be used. In this case, the angle formed by the two fibers F1, F2 need not to be 90°. The fibers may be disposed only in one spiral direction.

For forming the bent portion C at the time of production, the inner pipe 11 on which the fibers are wound is bent in a state in which the resin is not yet cured (prepreg) or a state in which the resin is not yet applied. During this period, the fibers that are parallel to the axial line of the fluid pipe 1 need to be contracted in the inner side IN of the bent portion C and be elongated in the outer side OUT of the bent portion C. However, when the fibers are parallel to the axial line, the fibers may be cut at the time of bending or may be deformed in such a manner that a bamboo is split, because the fibers are hardly contracted or elongated.

In contrast, the fibers that are oriented obliquely relative to the axial line of the fluid pipe can move while changing the orientation angle θ at the bent portion at the time of bending. Hereafter, this will be described with reference to FIGS. 14 to 16.

Figure 14B:
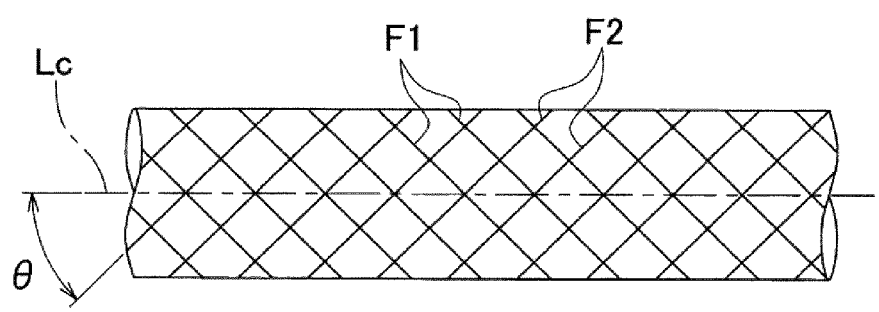
FIG. 14B is a model side view illustrating an orientation of fibers according to another example of the present invention.

Now, when the fibers include first fibers F1 that are arranged along the first spiral direction and second fibers F2 that are arranged along the second spiral direction as shown in FIG. 14B, if a straight pipe including the fibers F1, F2 is bent to form a bent portion C of FIG. 15A, the inner side IN of the bent portion C of FIG. 15C will be contracted, and on the other hand, the outer side OUT of the bent portion C of FIG. 15B will be elongated, as will be understood from these Figures.

Here, for simplifying the description, the first fibers F1 and the second fibers F2 will be illustrated in separation in FIGS. 16A and 16D.

Regarding the fibers F1, F2 that are arranged along the first or second spiral direction of FIG. 14B, when the whole pipe is attempted to be bent, the angle θ formed by the axial line Lc and the fibers F1, F2 will be smaller as compared with the straight pipe portions S1 to S3 in order to meet the elongation of the outer side, as shown in FIGS. 16B and 16E.

On the other hand, regarding the fibers F1, F2 that are arranged along the first or second spiral direction of FIG. 14B, when the whole pipe is attempted to be bent, the orientation angle θ will be larger as compared with the straight pipe portions S1 to S3 in order to meet the contraction of the inner side, as shown in FIGS. 16C and 16F.

That is, the orientation angle θ at the bent portion C is larger in the inner side IN of the bent portion C than in the outer side OUT of the bent portion C.

In accordance with such a change in the orientation angle θ, at the bent portion C, the number of the fibers F1, F2 in the inner side IN of the bent portion C per unit surface area is larger than the number of the fibers F1, F2 in the outer side OUT of the bent portion C per unit surface area, as will be understood from FIGS. 16 and 15.

In order to allow the bending of the pipe, it is further preferable that no fibers are arranged along the axial line of the fluid pipe on both an inner side and an outer side of the bent portion.

Here, even if fibers arranged along the axial line of the fluid pipe are arranged at the portion shown by a one-dot chain line (the position parallel to the axial line Lc) in FIG. 15A that are neither contracted nor elongated before and after the bending, it will not be an obstacle against this bending.

As the resin, a thermosetting resin can be generally used. However, an ultraviolet curing resin or a chemical reaction type curing resin such as a two-liquid type can also be adopted.

As the thermosetting resin, for example, a resin such as epoxy, unsaturated polyester, bismaleimide, or polyamide can be used. Among these resins, epoxy has high strength, high temperature resistance, and high chemical resistance, and is also excellent in the processability, so that epoxy can be suitably adopted.

On the other hand, as the fibers, nonmetal fibers are preferable. For example, besides glass, carbon, aramide, or boron can be adopted. The carbon fibers have high strength, whereas the glass fibers are less likely to be broken during the process of bending the fluid pipe and are less expensive though having smaller strength than the carbon fibers.

Flowmeter Using the Fluid Pipe 1 Made of Resin:

Next, a flowmeter using a fluid pipe 1 made of the inner pipe 11 and the outer pipe 2 will be described. Here, the constitution other than the parts described below is the same as that of Example 1 described above, so that the same parts or the corresponding parts will be denoted with the same reference numbers, and the description thereof will not be given.

Figure 19:
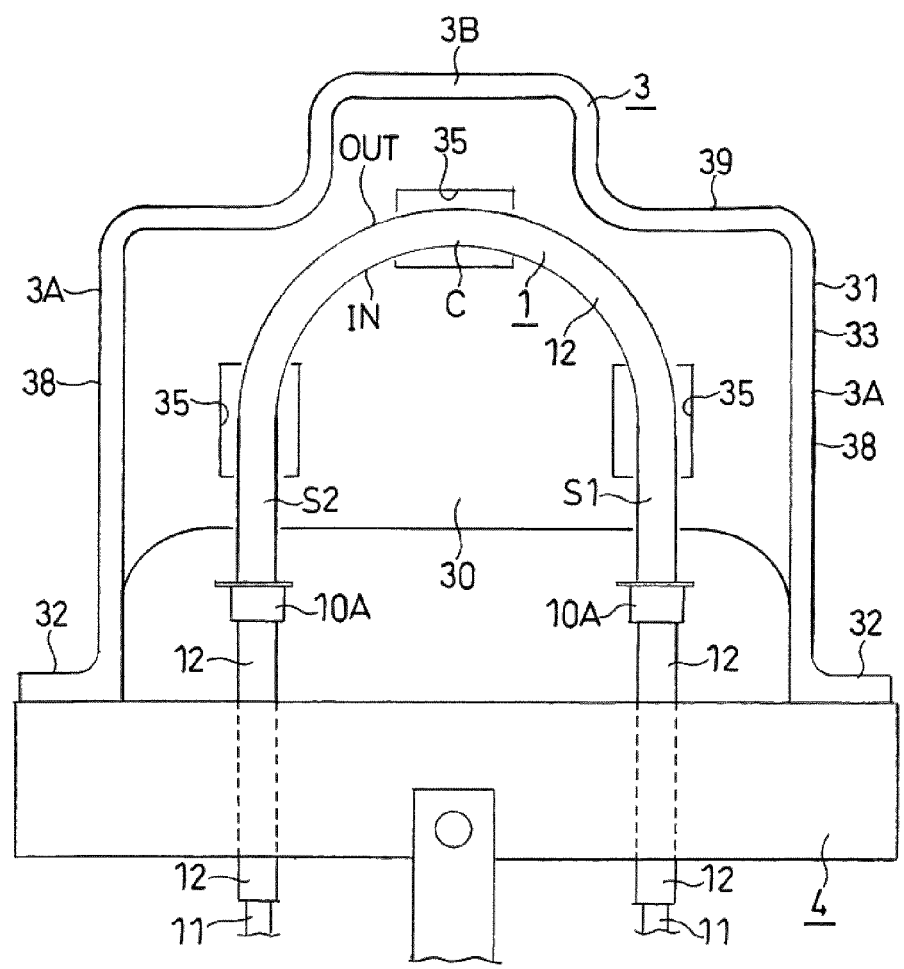
FIG. 19 is a schematic front view illustrating the same flowmeter.

As shown in FIGS. 18 and 19, a fluid pipe 1 having an outer pipe 12 is fixed in a penetrating state on a supporting base 4. The fluid pipe 1 made of fluororesin without having the outer pipe 12 is housed in a pipe case 7A shown in FIG. 18.

Figure 20:
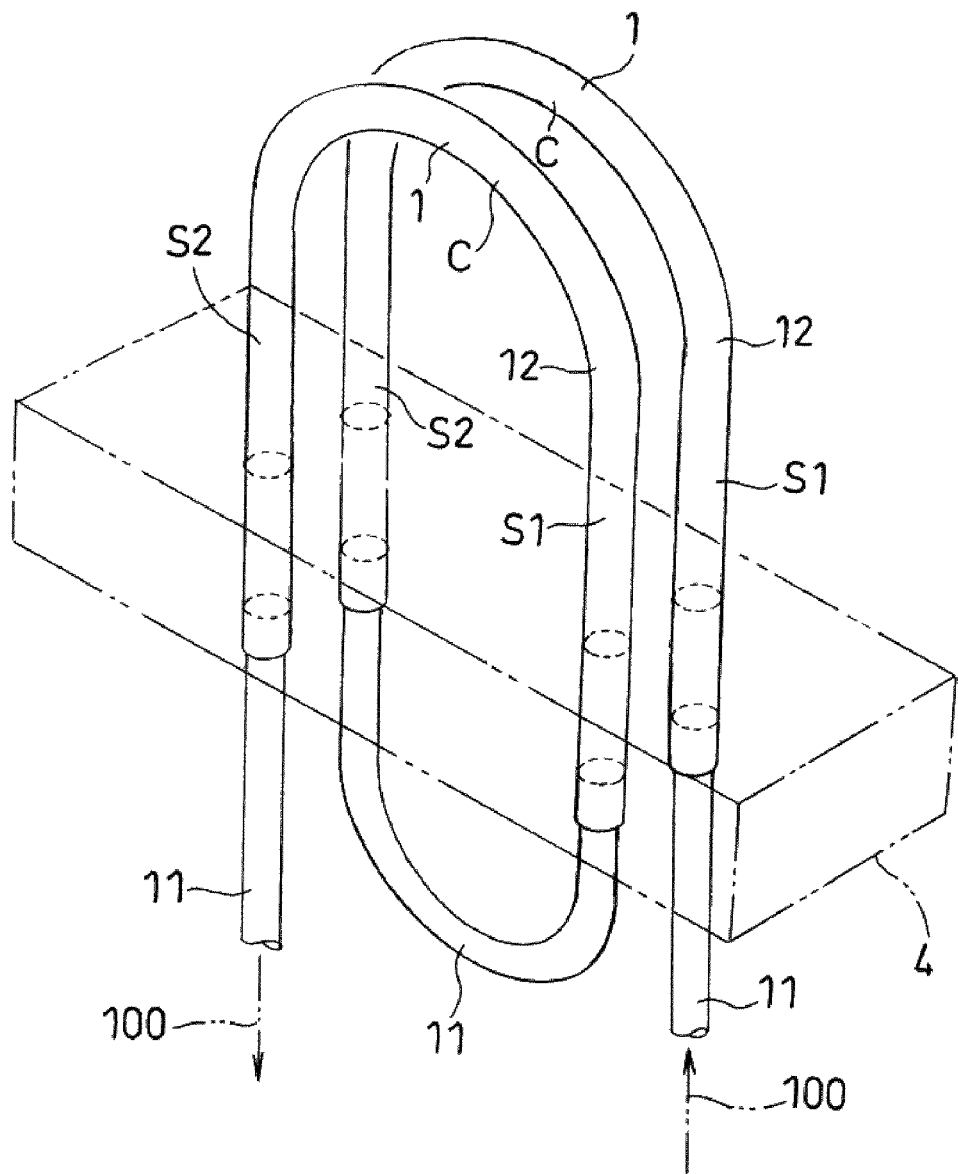
FIG. 20 is a schematic perspective view illustrating a mounted state of a fluid pipe.

As shown in FIG. 20, the fluid pipe 1 includes one continuous inner pipe 11 and a pair of outer pipes 12 disposed at a part of the outer circumferential surface 13 of the inner pipe 11, and a measurement fluid flows in series within the fluid pipes 1, 1. That is, a measurement fluid 100 that has flowed in from one end of the inner pipe 11 passes through the inner pipe 11 covered by one of the outer pipes 12, passes through the inner pipe 11 that is exposed below the supporting base 4, and passes through the inner pipe 11 covered by the other of the outer pipes 12 to be discharged.

Figure 21:
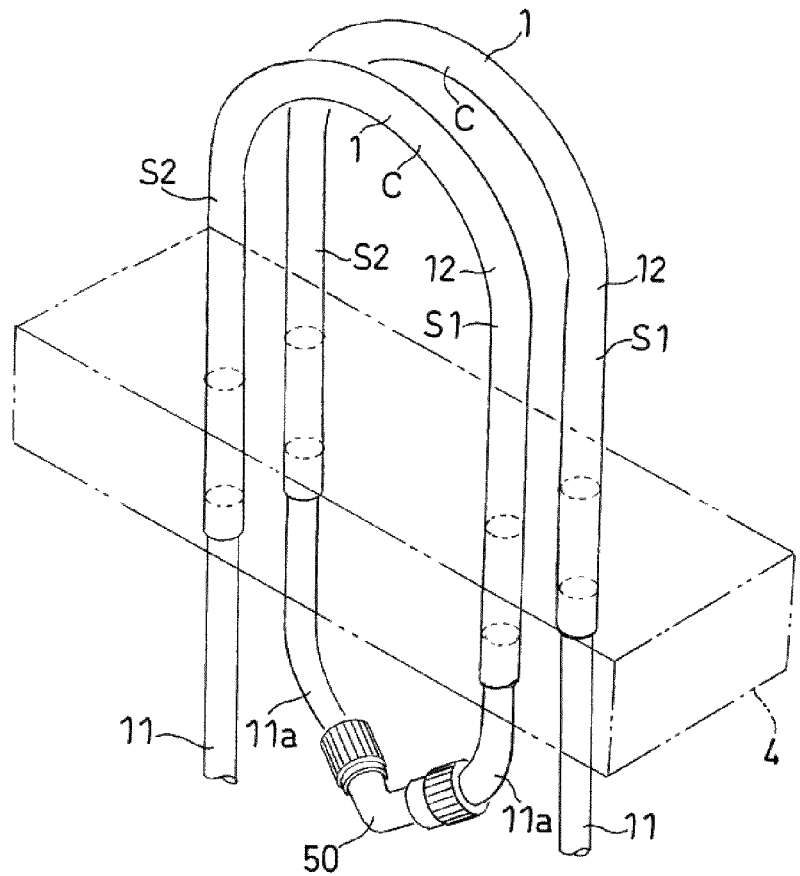
FIG. 21 is a schematic perspective view illustrating a mounted state of another fluid pipe.

Here, since the outer pipe 12 is cured into a predetermined shape, it is difficult to fix it by passing it through the supporting base 4. Therefore, as shown in FIG. 21, the pair of fluid pipes 1 is inserted into the supporting base 4 from above, and ends 11a of the inner pipe 11 protruding below the supporting base 4 may be connected with each other with use of an elbow 50.

Figure 22:
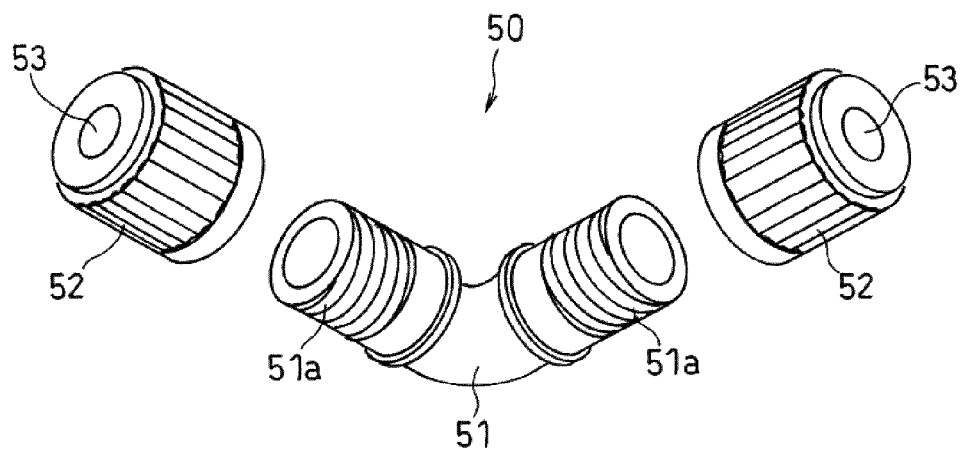
FIG. 22 is an exploded perspective view illustrating an elbow for connecting the fluid pipe.

As shown in FIG. 22, as the elbow 50, an elbow made of fluororesin having a commercially available union joint can be adopted. The elbow 50 is made of an elbow main body 51 and union nuts 52 that will be engaged with male screws 51a formed at both ends of the elbow main body 51.

In order to fix the inner pipe 11 to the elbow 50, the end 11a of the inner pipe 11 is inserted into a insertion hole 53 formed in the union nuts 52, and the union nuts 52 are made to engage with the male screw 51a, whereby the inner pipe 11 will be fixed to the elbow 50 via the union nuts 52.

Here, a union joint of straight pipe type may be used instead of the elbow 50.

As shown in FIGS. 23A and 23B, the measurement fluid may be allowed to flow in parallel by using a pair of connection blocks 60 having a flow path 61 with a Y shaped side surface cross section. In this case, for example, as shown in FIG. 23A, the inner pipes 11 of the pair of fluid pipes 1 are inserted and fixed into the Y shaped flow path 61.

Generally, when a measurement fluid is allowed to flow in parallel, the measurement precision will decrease because it is difficult to supply the measurement fluid 100 exactly uniformly into the pair of fluid pipes 1; however, the flowmeter will have a simpler structure, and can be produced at a low cost.

Connection Member 10A:

As shown in FIG. 18, the first straight pipe portions S1, S1 and the second straight pipe portions S2, S2 of the pair of fluid pipes 1 are respectively fixed with each other by a connection member 10A. As shown in FIG. 24, the connection member 10A is made of a plate-shaped connection member main body 10b and a pair of annular portions 10c that is integrally formed with the connection member main body 10b. The outer pipe 12 of the fluid pipe 1 is inserted into the annular portion 10c and is bonded with an epoxy resin, whereby the pair of fluid pipes 1 will be connected with each other.

By fabricating the connection member 10A with a resin having a high affinity to the outer pipe 12, the connection member 10A and the outer pipe 12 can be bonded with use of an adhesive and be fixed to each other.

Figure 25:
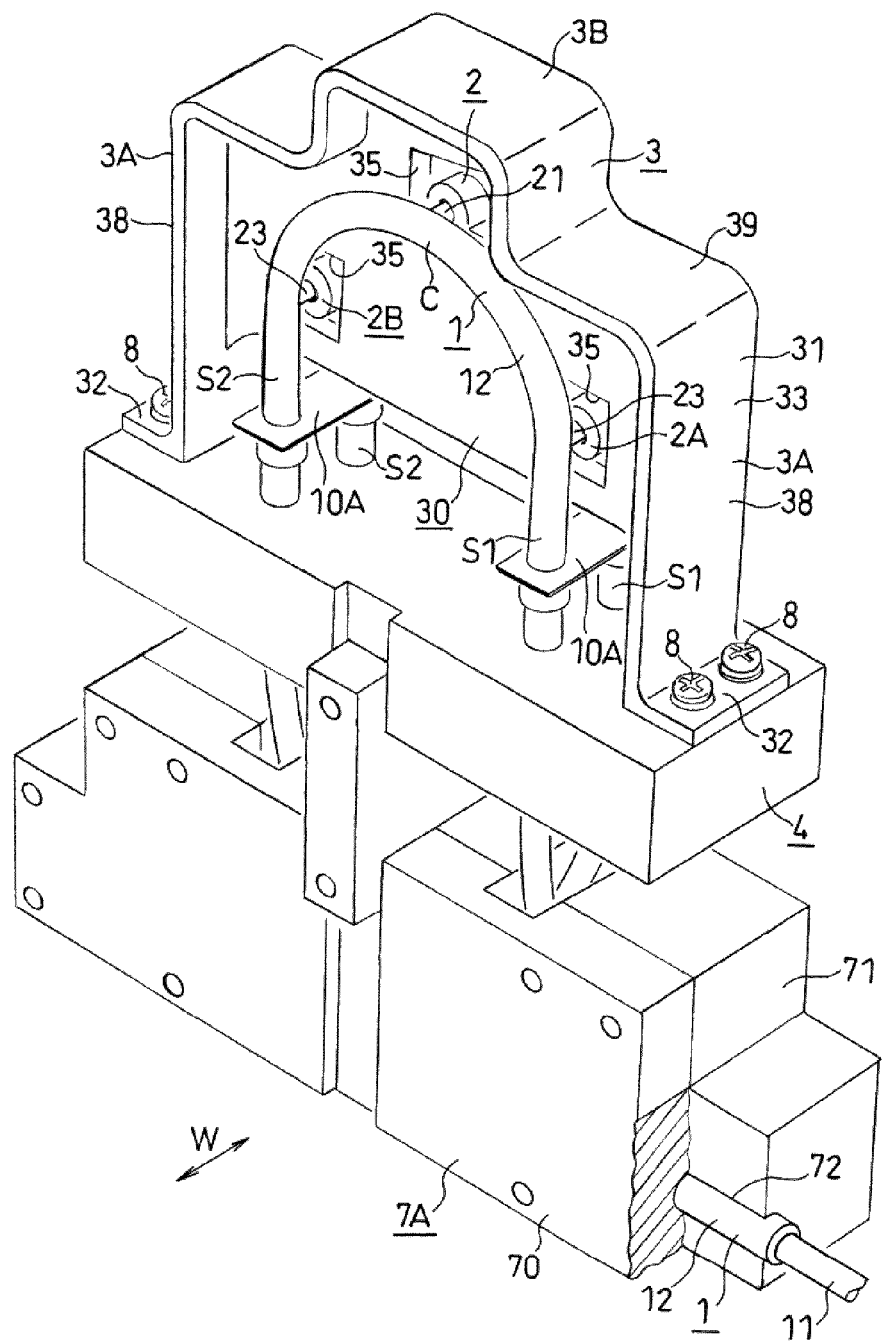
FIG. 25 is a schematic perspective view of a flowmeter in which a pipe case is shown by partially fractured.

Fixing of the Fluid Pipe 1 in the Pipe Case 7A:

As shown in FIG. 25, the pipe case 7A is made of split cases 70, 71 that have been divided into two for sandwiching and fixing the fluid pipe 1, and a groove 72 is formed in the split cases 70, 71 for sandwiching the outer pipe 12. By sandwiching the fluid pipe 1 into the groove 72 via the outer pipe 2 and fastening the split cases 70, 71 with each other, the fluid pipe 1 will be fixed at the groove 72. Accordingly, the fluid pipe 1 can be easily fixed.

Resin Coating:

The supporting base 4 and the pipe case 7A are formed with resin, and resin coating is performed on the frame 3 made of metal. By forming the frame 3 with metal, the decrease in the measurement precision can be prevented because the rigidity and the weight of the frame 3 are large, and by performing resin coating on the frame 3, the corrosion of the metal by chemical substances can be prevented.

On the other hand, the frame 3 itself may be formed with resin. In such a case, the durability will be improved because the corrosion by chemical substances is prevented, though the measurement precision decreases because the rigidity and the weight of the frame 3 are smaller as compared with the case of using a metal.

Further, by performing resin coating on the metal parts such as the coil parts or wiring parts of the oscillator 2 and the detectors 2A, 2B, the corrosion of the flowmeter by chemical substances can be further more prevented.

The present invention can be applied to what is known as a mass flowmeter of Coriolis type.

What is claimed is:

1. A flowmeter comprising:
a pair of fluid pipes forming a flow path for a measurement fluid, having a substantially equal shape and equal size with each other, and arranged to be substantially mirror-symmetric and parallel;
an oscillator including a coil and a pair of magnetic substances for oscillating the fluid pipes, each of the pair of magnetic substances in the oscillator being attached to the respective fluid pipes;
a plurality of detectors disposed to be spaced apart from each other along the flow path of the fluid pipes and including a coil and a pair of magnetic substances for detecting a state of vibration of the fluid pipes, each of the pair of magnetic substances in the plurality of detectors being attached to the respective fluid pipes;
a calculator that calculates a mass flow rate of the measurement fluid that passes through the flow path of the fluid pipes based on each vibration that is detected by the plurality of detectors,
a supporting base to which an end portion of each of the fluid pipes is mounted and which supports each of the fluid pipes in a manner capable of being vibrated;
a frame fixed to the supporting base
said frame being integrally formed with (a) a mounting portion having a penetrating portion for mounting the coil in the oscillator and the respective coils in the plurality of detectors, (b) a reinforcing portion disposed at an outer circumference of the mounting portion and enhancing a rigidity of the mounting portion, and (c) a fixing portion for being fixed to the supporting base, and
wherein the mounting portion is disposed between the pair of fluid pipes, and having a thickness that does not interfere with the pair of fluid pipes, and the reinforcing portion has an outer wall portion that protrudes at least to one side of a thickness direction of the mounting portion, and substantially continuously surrounds an outer circumference of the fluid pipes.

2. The flowmeter according to claim 1, wherein the penetrating portions are formed with through-holes.

3. The flowmeter according to claim 1, wherein the penetrating portions are formed with cut-out portions, and further comprise a reinforcing section for reinforcing the cut-out portions.

4. The flowmeter according to claim 1, wherein the mounting portion has a plate-shaped plate portion having a thickness smaller than a distance between the pair of fluid pipes, and a width of the outer wall portion relative to the thickness direction is larger than the distance between the pair of fluid pipes.

5. The flowmeter according to claim 1, wherein the outer wall portion is formed by interconnection of a pair of first portions extending in a direction away from the supporting base and a second portion disposed at a position distant from the supporting base and connecting the pair of first portions.

6. The flowmeter according to claim 5, wherein the second portion is bent or warped and formed so as to be arranged along the coil in the oscillator and the coil in each of the plurality of detectors.

7. The flowmeter according to claim 5, wherein the mounting portion connects the first portions with each other in an inside of the outer wall portion.

8. The flowmeter according to claim 1, wherein an opening obtained by cutting out the mounting portion is formed in the vicinity of the supporting base, and the mounting portion is not in contact with the supporting base because of the cutting out.

9. The flowmeter according to claim 1, further comprising a pair of connection members that connects between the pair of fluid pipes at a position between the supporting base and the detectors, for regulating a distance between the pair of fluid pipes at the connection portions, wherein the mounting portion has a cut-out opening so as not to interfere with the pair of connection members.

10. The flowmeter according to claim 1, wherein the frame further has, between the supporting base and the penetrating portions, a second reinforcing portion formed on the mounting portion, enhancing the rigidity of the mounting portion and having a thickness that does not interfere with the pair of fluid pipes.

11. The flowmeter according to claim 1, wherein the frame is constituted in such a manner that a pair of leg portions disposed to stand on the supporting base and a beam portion disposed to bridge between the pair of leg portions are integrally formed, and the penetrating portions are formed in the mounting portion at the beam portion.

12. The flowmeter according to claim 11, wherein the beam portion is formed to have a convex shape.

13. The flowmeter according to claim 1, wherein the supporting base is composed of a member made of metal, and a resin member that is made of a resin having a thick plate shape and serves to weaken transmittance of vibration to the supporting base is disposed on a surface of the supporting base opposite to a surface to which the frame is fixed.

14. The flowmeter according to claim 1, wherein a cut-out portion for wiring for passing a wiring member connected to the coil through the outer wall portion is formed in the outer wall portion, and a guiding chip for guiding the wiring member penetrating through the cut-out portion in a space inside the outer wall portion and preventing the wiring member from being brought into contact with the fluid pipe is provided.

15. The flowmeter according to claim 14, wherein the guiding chip is integrally formed with the frame so as to be connected to the outer wall portion and/or the mounting portion.

16. The flowmeter according to claim 1, further comprising a bobbin for winding the coil and a yoke for attaching the magnetic substance, wherein
a positioning portion for positioning the yoke relative to the bobbin is formed in the bobbin,
the fixing portion protrudes to both sides of a thickness direction of the mounting portion, and
the fixing portion is provided with an insertion hole for inserting a fastening tool for fastening the fixing portion to the supporting base, where the insertion hole is made to be a long hole capable of moving the frame in the thickness direction.

17. The flowmeter according to claim 1, wherein the pair of fluid pipes comprises:
an inner pipe made of a fluororesin in which inner circumferential surface is in contact with the flow path; and
an outer pipe having fibers that are arranged in order to surround an outer circumferential surface of the inner pipe and a resin that is cured in a closely adhering state between the fibers that are arranged in order, and having an elastic modulus larger than that of the inner pipe.

* * * * *